(12) United States Patent
Maksimovic et al.

(10) Patent No.: US 10,855,203 B2
(45) Date of Patent: Dec. 1, 2020

(54) MODULAR SCALABLE POWER CONVERSION

(71) Applicants: The Regents of the University of Colorado, a body corporate, Denver, CO (US); Alliance for Sustainable Energy, LLC, Golden, CO (US)

(72) Inventors: Dragan Maksimovic, Boulder, CO (US); Prasanta Achanta, San Jose, CA (US); Brian B. Johnson, Denver, CO (US); Miguel Rodriguez, Golden, CO (US); Vahan Gevorgian, Westminster, CO (US)

(73) Assignees: The Regents of the University of Colorado, a body corporate, Denver, CO (US); Alliance for Sustainable Energy, LLC, Golden, CO (US)

(*) Notice: Subject to any disclaimer, the term of this patent is extended or adjusted under 35 U.S.C. 154(b) by 0 days.

(21) Appl. No.: 16/402,222

(22) Filed: May 2, 2019

(65) Prior Publication Data

US 2020/0067423 A1    Feb. 27, 2020

Related U.S. Application Data

(60) Provisional application No. 62/637,645, filed on Mar. 2, 2018, provisional application No. 62/814,709, filed on Mar. 6, 2019.

(51) Int. Cl.
*H02M 7/5387* (2007.01)
*H02M 7/48* (2007.01)

(52) U.S. Cl.
CPC ..... *H02M 7/53875* (2013.01); *H02M 7/4826* (2013.01)

(58) Field of Classification Search
CPC .......... H02M 7/53875; H02M 7/4826; H02M 7/5387; H02M 7/42; H02M 7/44; H02M 7/48
See application file for complete search history.

(56) References Cited

U.S. PATENT DOCUMENTS

| | | | |
|---|---|---|---|
| 2013/0027993 A1* | 1/2013 | Tan ................. | H02M 7/515 363/40 |
| 2013/0027997 A1* | 1/2013 | Tan ................. | H02J 3/385 363/95 |
| 2014/0183953 A1* | 7/2014 | Harrison ........... | H02J 3/385 307/52 |
| 2015/0016159 A1* | 1/2015 | Deboy .............. | H02J 3/383 363/71 |
| 2018/0254732 A1* | 9/2018 | Smolenaers ....... | H02J 7/022 |
| 2019/0131888 A1* | 5/2019 | Zhong .............. | H02M 7/797 |

* cited by examiner

*Primary Examiner* — Adolf D Berhane

(57) ABSTRACT

A cascaded architecture composed of interconnected blocks that are each designed to process constant power and eliminate bulk energy storage are provided. Further, local controls within each block natively achieve both block- and system-level aims, making the system modular and scalable. Further methods of providing power conversion using such interconnected clocks are also provided.

20 Claims, 25 Drawing Sheets

TABLE II
PARAMETERS OF THE EXPERIMENTAL PROTOTYPE

| | | |
|---|---|---|
| $N$ | No. of block modules | 3 |
| $f_Q$ | QAB switching frequency | 100kHz |
| $f_H$ | H-bridge switching frequency | 20kHz |
| $n$ | Transformer turns ratio | 1 |
| $C_{pv}$ | Input capacitance | 90 $\mu$F |
| $C$ | Dc-link capacitance | 180 $\mu$F |
| $L$ | Leakage inductance | 23 $\mu$H |
| $K_p$ | Proportional gain | 2.962 x $10^{-1}$ rad/V |
| $K_i$ | Integral gain | 7.5 x $10^{-3}$ rad / V |
| | MOSFETs | BSC046N10NS3 G |
| | Microcontroller | TMS320F28379D |
| Experiments with PV module | | |
| Vmpp | PV module's MPP voltage | 36.8 V |
| z | load impedance | [0.147 j + (10 \|\| -289 j ) $\Omega$ |
| Standalone cascaded experiments | | |
| $v^{in}$ | Input voltage | 40V |
| z | load impedance | [0.147 j + 950 \|\| -289 j )] $\Omega$ |
| Grid-tied cascaded experiments | | |
| w | Grid frequency | 20$\pi$60 rad/s |
| $v^{in}$ | Input voltage | 43 V |
| $v^g$ | Grid voltage | [ 75, 75, 75] Vrms |
| $R_d$ | Virtual droop resistance | 10 $\Omega$ |
| z | filter impedance | [ 2 +0.35j] $\Omega$ |

*FIG. 12*

| p DC \ s 3φAC | Isolated | Series | Parallel |
|---|---|---|---|
| Isolated | ✓ | ✓ | ✓ |
| Series | ✓ | ✓ | ✓ |
| Parallel | ✓ | ✓ | ✓ |

| Primary side<br>DC | Secondary side<br>3φ AC |
|---|---|
| • Battery<br>• PV<br>• LVDC<br>• MVDC<br>• DC load | • Wind turbine<br>• MVAC<br>• LVAC<br>• AC loads |

LVDC to MVAC

| p DC \ s DC | Isolated | Series | Parallel |
|---|---|---|---|
| Isolated | ✓ | ✓ | ✓ |
| Series | ✓ | ✓ | ✓ |
| Parallel | ✓ | ✓ | ✓ |

| Primary side DC | Secondary side DC |
|---|---|
| • Battery | • Battery |
| • PV | • PV |
| • LVDC | • LVDC |
| • MVDC | • MVDC |
| • DC load | • DC load |

FIG. 37

| p DC \ s | Isolated | Series | Parallel |
|---|---|---|---|
| Isolated | ✓ | ✓ | ✓ |
| Series | ✓ | ✓ | ✓ |
| Parallel | ✓ | ✓ | ✓ |

| Primary side DC | Secondary side 1φ AC |
|---|---|
| • Battery | • Grid |
| • PV | • AC load |
| • LVDC | |
| • MVDC | |
| • DC load | |

* Needs energy storage capacitor

FIG. 38

MODULAR SCALABLE POWER CONVERSION

CROSS-REFERENCE TO RELATED APPLICATIONS

This application claims the benefit of U.S. provisional application No. 62/637,645 entitled "Modular Scalable Power Conversion" and filed Mar. 2, 2018 and U.S. provisional patent application No. 62/814,709 entitled "Modular Scalable Power Conversion" and filed on Mar. 6, 2019, each application of which is hereby incorporated by reference as though fully set forth herein.

GOVERNMENT LICENSE RIGHTS

This invention was made with government support under Award No. DE-AC36-08GO28308 awarded by the U.S. Department of Energy. The government has certain rights in the invention.

BACKGROUND a. Field

The instant invention relates modular scalable power converters and methods of converting power using modular scalable power converters.

b. Background

Utility-scale photovoltaic (PV) inverters are predominantly built with single-stage topologies that interface with an externally installed low-voltage to medium-voltage line frequency transformer. Given the costs, maintenance, and power losses associated with line-frequency transformers, manufacturers are investigating transformerless architectures that produce medium-voltage ac (MVAC) directly. To achieve this aim, multilevel inverters act as a natural choice because the large number of series-connected devices not only allows for increased voltage blocking but also enables the synthesis of high-quality waveforms; however, existing multilevel inverters require bulky passive components that add costs or centralized controllers that impede scalability.

Existing transformerless topologies for utility-scale inverters fall under the following system types: i) modular multilevel converters (MMCs) with cascaded half- or full-bridge cells, and ii) systems containing interconnected active-bridge converters. One limitation of the MMC for PV applications stems from the fact that the dc input voltage must exceed the peak ac voltage. Since PV string voltages are typically at or less than 1.5 kV, this necessitates an additional boost converter stage to enable a MVAC output, which adds costs and decreases efficiency. Further, since the MMC is composed of distinct phase legs that each process pulsating power, MMC cells require large capacitor banks and a centralized voltage balancing controller.

On the other hand, systems of active-bridge converters facilitate large voltage-conversion ratios facilitated by isolation transformers. For instance, active-bridge converters are often connected in parallel at the low-voltage PV input, and the output sides can be cascaded to produce MVAC. Although this acts as a key advantage over MMCs for PV systems, existing approaches still rely on centralized controllers, which impede scalability and act as a single point of failure. Furthermore, depending on the type of control strategy, large dc-link capacitors may still be needed.

BRIEF SUMMARY

A cascaded architecture composed of interconnected blocks that are each designed to process constant power and eliminate bulk energy storage are provided. Further, local controls within each block natively achieve both block- and system-level aims, making the system modular and scalable. Further methods of providing power conversion using such interconnected clocks are also provided.

In one implementation, a photovoltaic (PV) inverter architecture comprises stackable dc to three-phase ac converter blocks. In this particular implementation, several such blocks, each containing a converter power stage and controls, are connected in series on their ac sides to obtain transformerless medium-voltage ac interfaces for PV power plants. The series-connected structure is enabled by a quadruple active bridge dc-dc converter that provides isolation between the PV input and each of the three ac-side phases within each block. Furthermore, since incoming PV power is transferred as constant balanced three-phase ac power, instantaneous input-output power balance bypasses the need for bulk energy storage. To streamline implementation and maximize system scalability and resilience, decentralized block-level controllers accomplish dc-link voltage regulation, maximum power point tracking, and ac-side power sharing without centralized control. The proposed architecture is validated by simulations of a PV string to medium-voltage ac system comprising six blocks and, on a proof-of-concept hardware prototype that comprises three cascaded converter blocks The blocks can provide scalability in voltage and/or power in various implementations.

The foregoing and other aspects, features, details, utilities, and advantages of the present invention will be apparent from reading the following description and claims, and from reviewing the accompanying drawings.

BRIEF DESCRIPTION OF THE DRAWINGS

FIG. 12 shows Table II including parameters of an experimental prototype.

FIGS. 37 and 38 show additional example applications for dc-dc conversion and dc to single-phase ac conversion, respectively.

DETAILED DESCRIPTION

Figure 25:
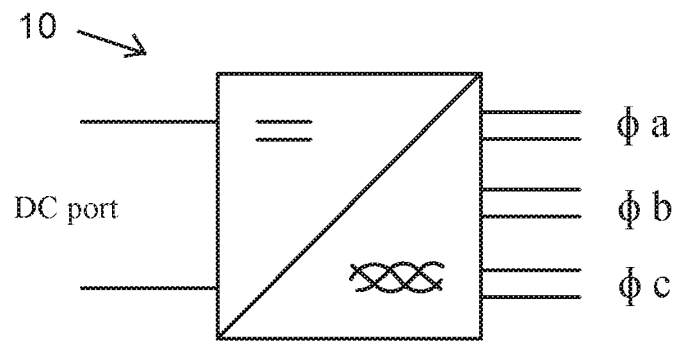
FIG. 25 shows an example implementation of a dc-ac converter module.

FIG. 25 shows an example implementation of a dc-ac converter module 10. A plurality of modules 10 may be connected in various configurations depending on application, such as described in more detail herein. The converter module 10 comprises at least one dc port 12 and at least one ac port 14. In the implementation of the dc-ac converter module 10 shown in FIG. 25, for example, the converter module 10 comprises at least one dc port and three individual ac ports, although other configurations/number of ports are contemplated. In this implementation, the three ac ports, for example, may comprise individual single-phase ports or a three-phase ac port. In other implementations comprising more than three ac ports, the ac ports may comprise a combination of one or more single-phase ac port and one or more three-phase ports.

In the dc-ac converter module 10, the module has isolation between the dc port and each one of the one or more single-phase ac ports.

The dc-ac converter module 10 may be bi-directional or uni-directional in either direction. Further, individual dc-ac converter modules 10 may be configured in virtually any configuration, such as coupled in series, in parallel, and/or in series and/or parallel with one or more other modules as needed for any particular application.

Figure 26:
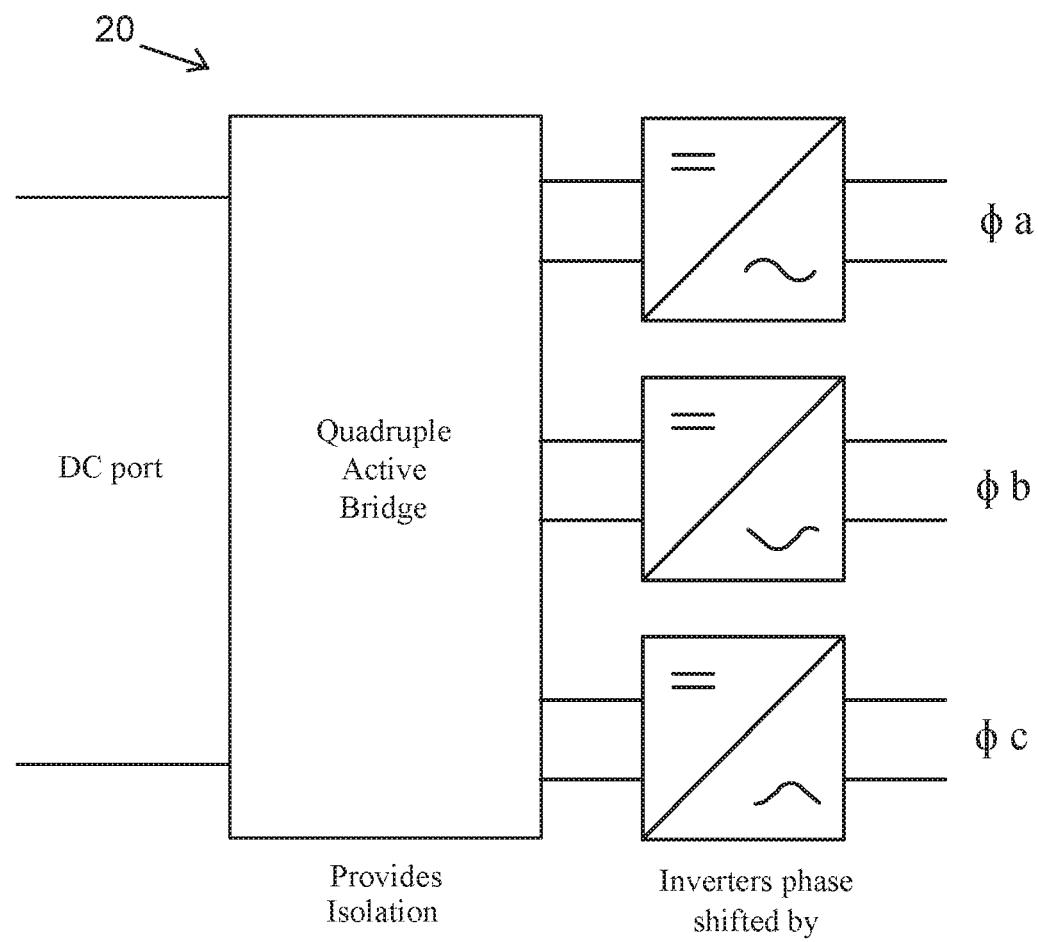
FIG. 26 shows another example implementation of a dc-ac converter module.

FIG. 26 shows another example implementation of a dc-ac converter module 20. The module comprises a dc port, a quadruple active bridge coupled across the dc port, a plurality of ac ports, each of the ac ports being isolated from the dc port via the quadruple active bridge. An inverter is coupled between each of the ac ports and the quadruple active bridge. In the particular implementation shown in FIG. 26, for example, the inverters are each phase shifted by 120 degrees to provide a three-phase ac output across three ac ports of the module.

Figures 27, 28:
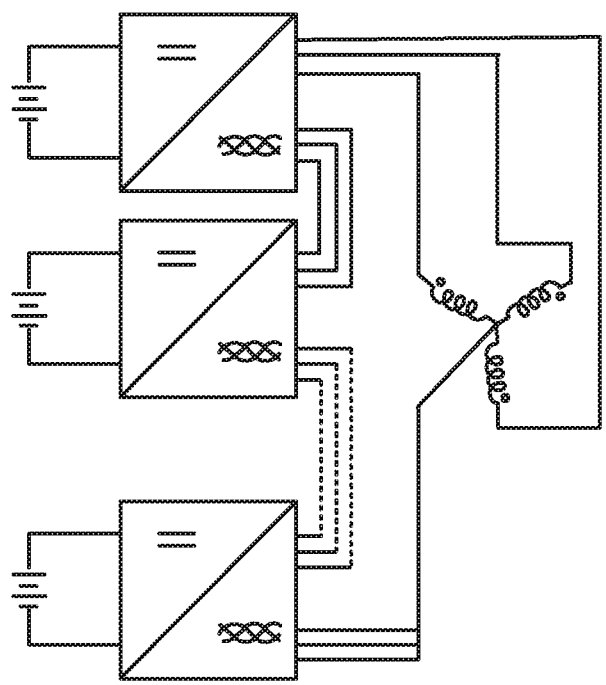
FIG. 27 shows example system configurations and applications incorporating a plurality of dc-ac converter modules and further provides example applications for such systems.
FIG. 28 shows an example implementation of a system providing isolated dc ports and a series connected three-phase wye ac output via ac ports of a plurality of individual dc-ac converter modules.

FIG. 27 shows example system configurations and applications incorporating a plurality of dc-ac converter modules and further provides example applications for such systems.

FIG. 28 shows an example implementation of a system providing isolated dc ports and a series connected three-phase wye ac output via ac ports of a plurality of individual dc-ac converter modules. In this particular implementation, for example, the system may provide conversion from LVDC to MVAC, although this is merely an example.

Figure 29:
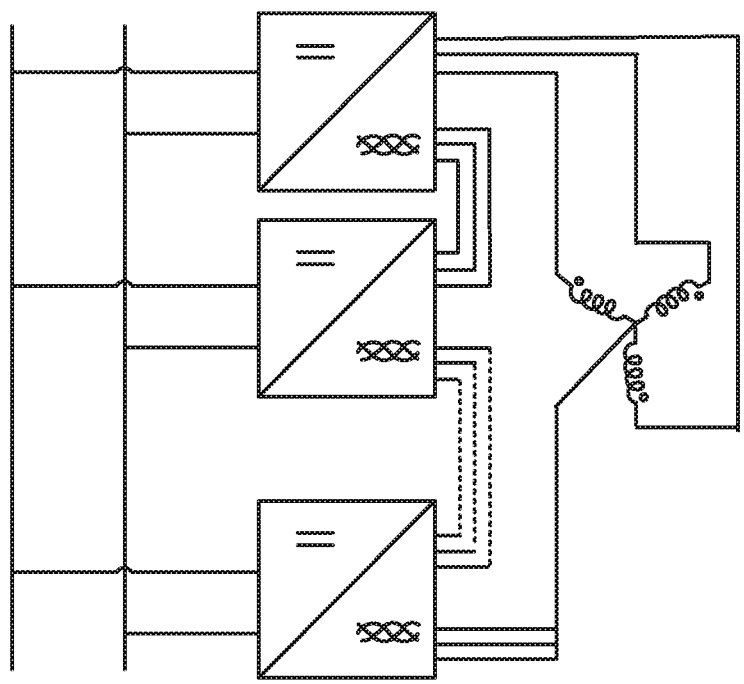
FIG. 29 shows another example implementation a system providing series connected dc ports and a series connected three-phase wye ac output via ac ports of a plurality of individual dc-ac converter modules.

FIG. 29 shows another example implementation a system providing series connected dc ports and a series connected three-phase wye ac output via ac ports of a plurality of individual dc-ac converter modules. In this particular implementation, for example, the system may provide conversion from MVDC to MVAC, although this is merely an example.

Figure 30:
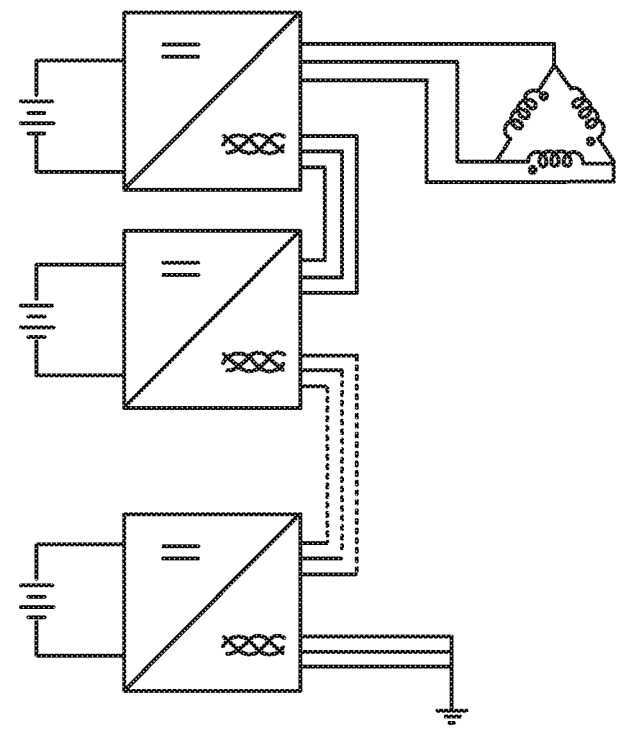
FIG. 30 shows another example implementation of a system providing isolated dc ports and series connected ac ports in a delta configuration.

FIG. 30 shows another example implementation of a system providing isolated dc ports and series connected ac ports in a delta configuration. The ac output may comprise a three-phase ac output, for example.

Figure 31:
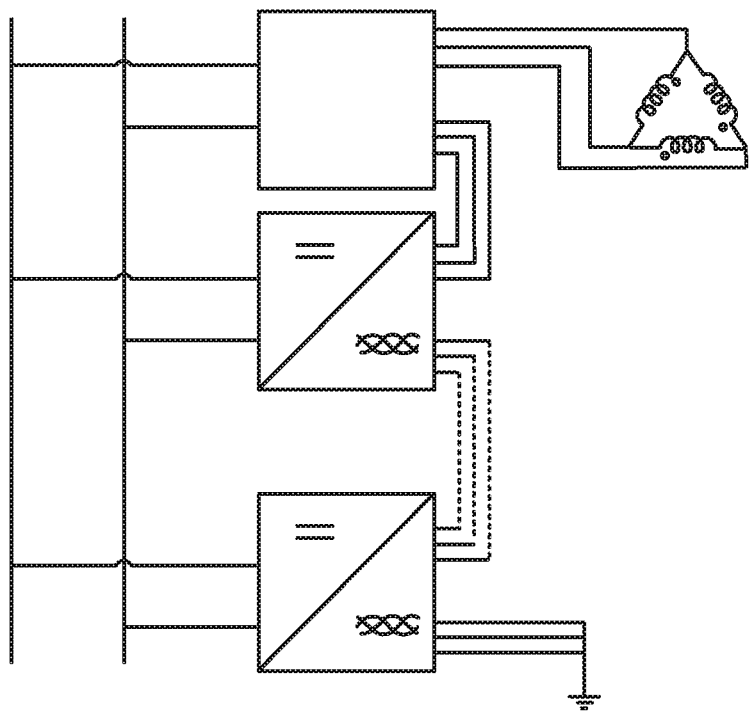
FIG. 31 shows another example implementation of a system providing parallel dc ports and series connected ac ports connected in a delta configuration.

FIG. 31 shows another example implementation of a system providing parallel dc ports and series connected ac ports connected in a delta configuration. The ac output may comprise a three-phase ac output, for example.

Figure 32:
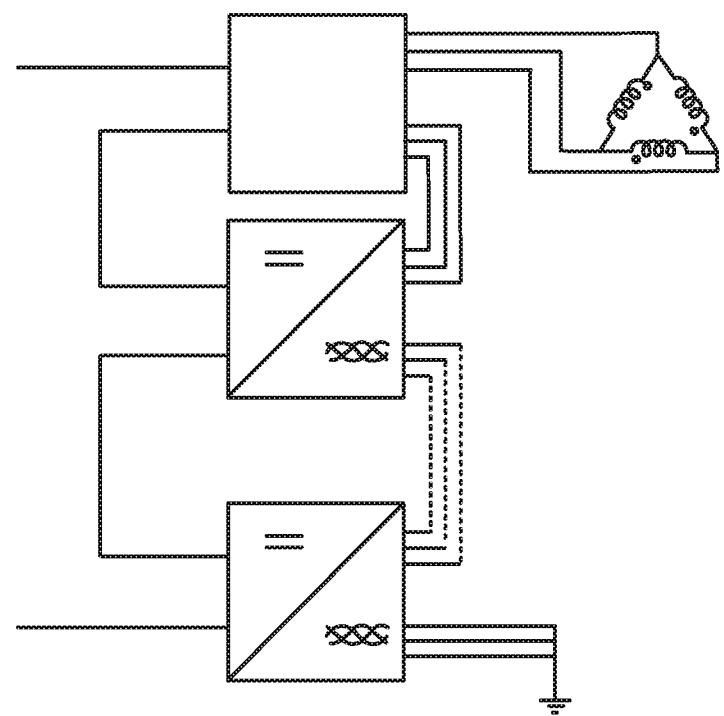
FIG. 32 shows another example implementation of a system providing series connected dc ports and series connected ac ports connected in a delta configuration.

FIG. 32 shows another example implementation of a system providing series connected dc ports and series connected ac ports connected in a delta configuration. The ac output may comprise a three-phase ac output, for example.

Figure 33:
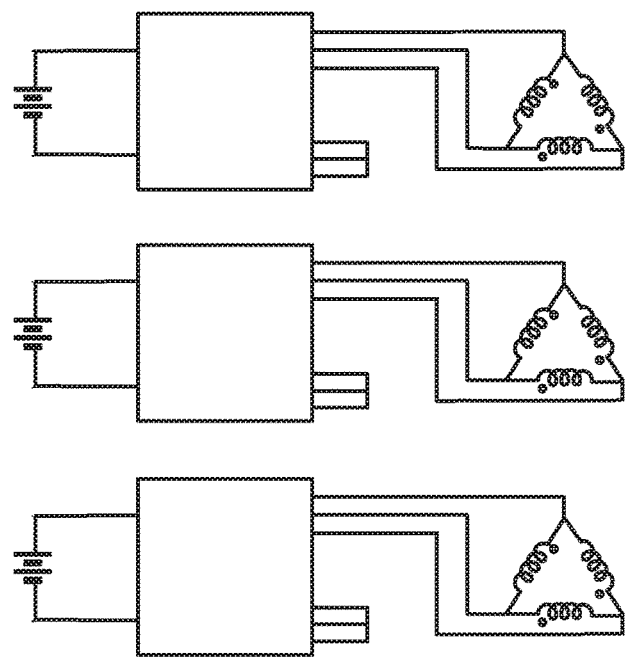
FIG. 33 shows another example implementation of a system providing isolated dc ports and isolated ac ports each individually connected in a delta configuration, although each individual module may comprise different port configurations for the various isolated ac ports.

FIG. 33 shows another example implementation of a system providing isolated dc ports and isolated ac ports each individually connected in a delta configuration, although each individual module may comprise different port configurations for the various isolated ac ports. The ac output may comprise a three-phase ac output, for example.

Figure 34:
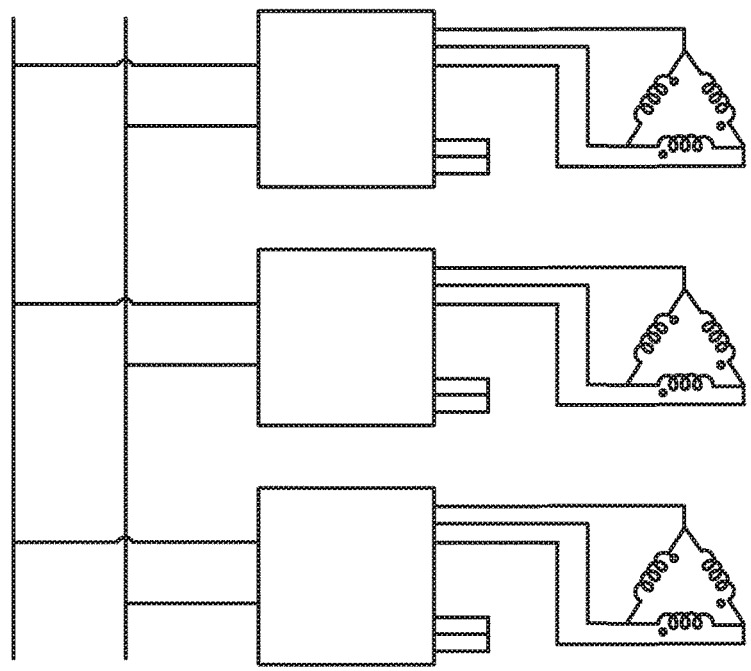
FIG. 34 shows another example implementation of a system providing parallel connected dc ports and isolated ac ports each individually connected in a delta configuration.

FIG. 34 shows another example implementation of a system providing parallel connected dc ports and isolated ac ports each individually connected in a delta configuration, although each individual module may comprise different port configurations for the various isolated ac ports. The ac output may comprise a three-phase ac output, for example.

Figure 35:
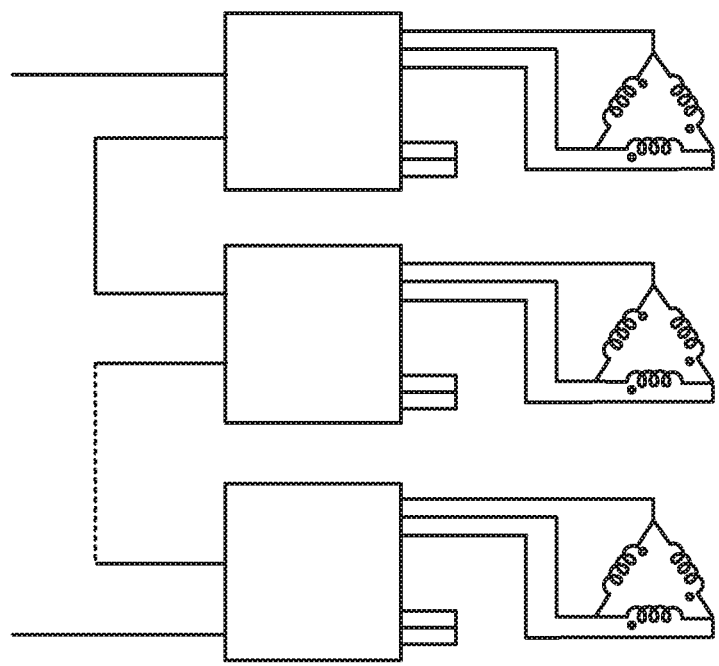
FIG. 35 shows another example implementation of a system providing series connected dc ports and isolated ac ports each individually connected in a delta configuration.

FIG. 35 shows another example implementation of a system providing series connected dc ports and isolated ac ports each individually connected in a delta configuration, although each individual module may comprise different port configurations for the various isolated ac ports. The ac output may comprise a three-phase ac output, for example.

Figure 36:
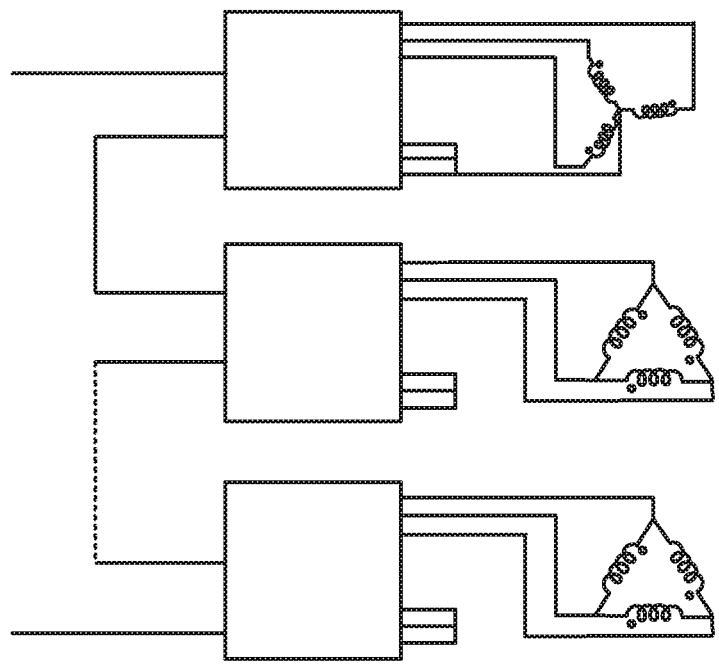
FIG. 36 shows another example implementation of a system providing series connected dc ports and isolated ac ports each individually connected in a wye configuration.

FIG. 36 shows another example implementation of a system providing series connected dc ports and isolated ac ports each individually connected in a wye configuration, although each individual module may comprise different port configurations for the various isolated ac ports. The ac output may comprise a three-phase ac output, for example FIGS. 37 and 38 show additional example applications for dc-dc conversion and dc to single-phase ac conversion, respectively.

Figure 1:
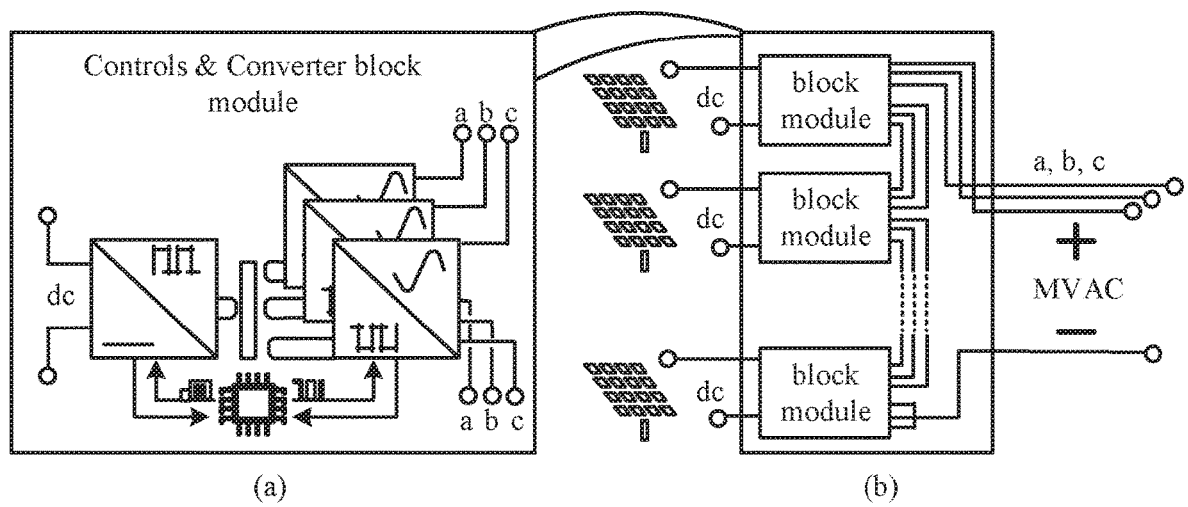
FIG. 1 shows a block diagram of an example control and converter block module in which dc to three-phase ac conversion forms a foundation of a transformerless architecture.

To obtain a modular, scalable and resilient system, one implementation of an architecture comprises fully modular blocks that have self-contained power electronics circuitry and autonomous controls, as shown in FIG. 1 in which a converter stack performs string-level MPPT on each PV string, while low-distortion waveforms are synthesized on the MVAC side. The primary difference from existing active-bridge architectures is that the architecture uses a half or full bridge power converter, such as a quadruple active bridge (QAB) to simultaneously provide isolation, which enables stackability, and ensure input-output power balance, which eliminates the need for bulk energy storage. This approach also differs from related methods with QABs in that the provided architecture uses the QAB exclusively for isolation and restrict its operation to the "dc-transformer" (DCX) regime where the conversion ratio is close to the transformer turns ratio and efficiency is maximized. Note that the QAB transformer requires medium voltage isolation between windings. Such isolation requirements are common in cascaded medium voltage architectures, and related transformer design approaches have been addressed in Y. A. Wang, D. M. Xiao, and Y. L. Liu, "Design of a planar power transformer for high voltage, high frequency use," in *Proc. IEEE PES T D*, April 2010, pp. 1-6; T. Guillod, J. E. Huber, G. Ortiz, A. De, C. M. Franck, and J. W. Kolar, "Characterization of the voltage and electric field stresses in multicell solid-state transformers," in *Proc. IEEE Energy Convers. Congr. Expo.*, September 2014, pp. 4726-4734; and M. Leibl, G. Ortiz, and J. W. Kolar, "Design and experimental analysis of amedium-frequency transformer for solid-state transformer applications," *IEEE J. Emerg. Sel. Topics Power Electron.*, vol. 5, no. 1, pp. 110-123, March 2017, each of which is incorporated by reference in its entirety as if fully set forth herein.

Since dc to three-phase ac conversion is accomplished within a single block, a set of block-level controls is provided to achieve system-wide objectives. In one implementation, for example, decentralized controllers are provided that achieve dc-link voltage regulation, maximum power point tracking (MPPT), and power sharing across the ac stack. Thus, the contributions are provided not only on the power stage, but also on the accompanying controls that can enable modular PV-to-MVAC systems without bulky line-frequency transformers.

Architecture Overview for an Example Photovoltaic System

Because of the distributed system architecture, vector and matrix notation may be used where a column-vector x is denoted as $x:=[x_1, \ldots, x_N]^T$. Next, $\text{diag}^{-1}(x)$ denotes a matrix with diagonal entries given by the elements x and zeros elsewhere. By extension, $\text{diag}^{-1}(x)$ has diagonal entries of $[x^{-1}_1, \ldots, x^{-1}_N]^T$. A vector of length l containing all ones is given by $1_l$. Three-phase quantities are compactly written as $x:=[x_a, x_b, x_c]^T$. To facilitate analysis, switched signals averaged over a sliding window of duration T are denoted as:

$$\langle x(t) \rangle_T := \frac{1}{T} \int_{t-T/2}^{t+T/2} x(\tau) d\tau. \tag{1}$$

Figure 2:
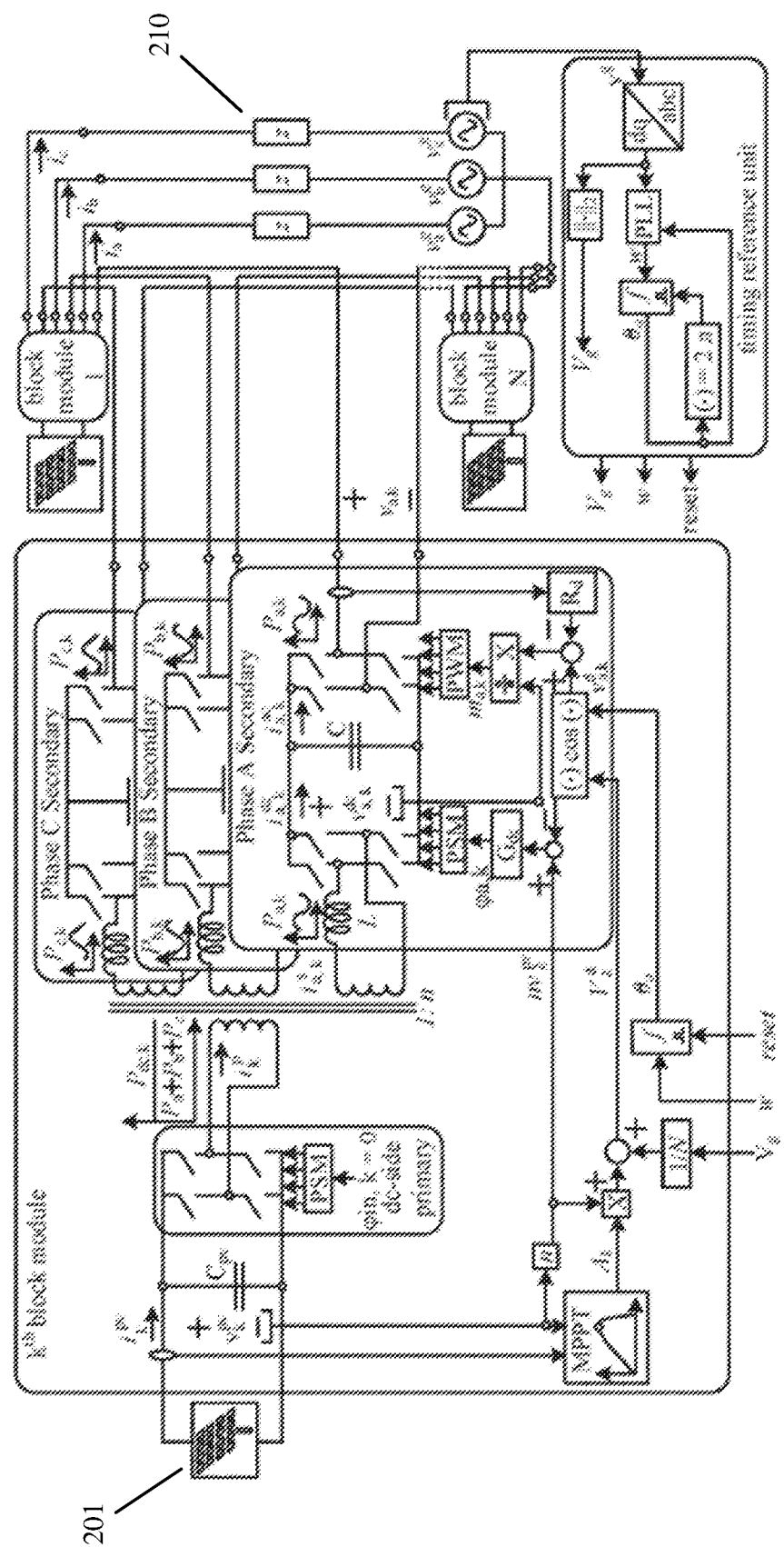
FIG. 2 shows a block diagram of an example transformerless inverter system.

The overall system in FIG. 2 contains N block modules where each dc to three-phase ac converter module has a dc input, a QAB dc-dc converter with 1:n winding ratios, and three dc-ac inverters on the output side. The dc-side of the kth block module is interfaced to a PV string with voltage $v^{pv}_k$, and current $i^{pv}_k$. Next, the $k_{th}$ QAB primary bridge current is denoted as $i^p_k$, and the secondary-side a, b, and c-phase QAB bridge currents within the column-vector $i^s_k:=[i^s_{ak}, i^s_{bk}, i^s_{ck}]^T$. The leakage inductance of each QAB secondary is denoted as L. Each corresponding block module contains three identical dc-link capacitances C, with voltages $v_{dck}=[v^{dc}_{a,k}, v^{dc}_{b,k}, v^{dc}_{c,k}]^T$. Dc-link currents injected and extracted by the QAB-side and inverter-side, respectively, are denoted as $i^{dc}_k:=[i^{dc}_{a,k}, i^{dc}_{b,k}, i^{dc}_{c,k}]^T$ and $i^{ac}_k:=[i^{ac}_{a,k}, i^{ac}_{b,k}, i^{ac}_{c,k}]^T$, respectively. The three inverter H-bridge voltages of the $k_{th}$ block are given by $v_k:=[v_{a,k}, v_{b,k}, v_{c,k}]^T$, and the three-phase currents delivered by the system are $i:=[i_a, i_b, i_c]^T$.

The converter stack interfaces with a medium-voltage grid that can be modeled as the balanced voltages $v_g:=[v^g_a, v^g_b, v^g_c]^T$. The impedance z encapsulates the grid-side filter. A single timing reference unit is contained within the system and is used to broadcast the grid frequency ω, the grid voltage a-phase zero crossings (via a binary reset signal), and the grid voltage amplitude $V_g$ to all N block modules. In this implementation, these signals are generated by a phase-locked loop (PLL).

The N block modules can have identical control structures. dc-side measurements can be processed by the MPPT controller which in turn modulates the three-phase ac-side voltage magnitude. The QAB can be controlled with three identical dc-link voltage controllers, denoted as $G_{dc}$. Finally, the k-th three-phase output ac side can be controlled to act like sinusoidal voltage sources $v^d_{a,k}:=[v^d_{a,k}, v^d_{b,k}, v^d_{c,k}]^T$ behind a virtual droop resistance Rd.

Circuit and Control Analysis
Power Stage Description

The four QAB bridges are controlled by phase shift modulation (PSM) where the primary bridge transistors are switched at a fixed frequency, $f_Q=1/T_Q$, and 50% duty ratio. Furthermore, the rising edge of the $k^{th}$ primary-side switch signal acts as a phase reference for its respective three secondaries where the phase shifts of the a-, b-, and c-side bridges are $\phi_{a,k}$, $\phi_{b,k}$, and $\phi_{c,k}$, respectively. Assuming small phase shifts, the average current delivered by the a-phase secondary can be approximated as:

$$\langle i^{dc}_{a,k}(t)\rangle_{T_Q} \approx \frac{v^{pv}_k \varphi_{a,k}(t)}{2\pi f_Q L}, \quad (2)$$

where expressions for b and c-phase secondary currents take correspondingly similar forms.

FIG. 2 illustrates the QAB transformer as one multi-winding transformer. However, equivalent functionality can be obtained with three distinct but identical dual-winding transformers that couple the dc side to each respective phase. Although the multi-winding implementation may yield gains in power density due to constant power transfer, the choice between one or three transformers is primarily dictated by voltage ratings and isolation requirements. For instance, because a single multi-winding transformer must withstand the peak voltage differences between each ac phase and the PV input 201, it will be necessary to ensure proper spacing between windings and/or insulating dielectric materials between windings.

As a consequence of the proposed dc-link control strategy (described in Section III-B), pulsating power is delivered by each QAB secondary and transferred directly to the grid-side inverters (see Pa,k, Pb,k, and Pc,k in FIG. 2). Because of direct line frequency energy transfer, each dc link stores constant energy and can be minimally sized to absorb just the high-frequency switching ripple. This contrasts with existing architectures that require large dc-link capacitances to buffer line-frequency power. Since net constant balanced three-phase grid-side power is matched at all times with PV-side dc power (i.e., $P_{a,k}+P_{b,k}+P_{c,k}=P_{dc,k}$ in FIG. 2), this allows for the elimination of bulky passives within each converter.

Each grid-side H-bridge inverter is modulated via sine-triangle unipolar PWM such that each bridge provides a three-level voltage waveform. Switch interleaving among the N cascaded H-bridges in each phase is obtained by uniformly phase shifting the N carrier waveforms amongst the block modules. Here, carrier interleaving is obtained via a combination of the PLL zero-crossing reset signal, which acts as a time reference for all units, and the locally computed phase shift based on the block module index number. Accordingly, the three-phase stack voltages, $\Sigma^N_{k=1}v_k$, take on 2N+1 levels for each ac phase.

Regarding system-level design, the number of cascaded units can be decided based on the grid voltage rating. Furthermore, the number of cascaded units and their cumulative voltage rating should be chosen with sufficient margin such that a small number of failed units can be bypassed without interrupting system operation. Last, system expansion can be done in discrete stages (add a new stack of N block modules) instead of incrementally (add one block-module to an existing stack).

Control Design

The timing reference unit contains a PLL that computes $\omega$ and Vg. A zero-crossing detector is triggered when the PLL angle, $\theta a$, crosses zero. In one implementation, a PLL that comprises a compensator in closed loop with an abc-to-dq coordinate transformation can be used. Since the grid voltage, Vg, and frequency, $\omega$, typically stay close to constant over any given ac cycle, the value of $\omega$ is transmitted to all N blocks only once each ac cycle along with the zero-crossing reset signal. This strategy can minimize or at least reduce the broadcast bandwidth requirements and eases implementation. Also note that the timing reference unit performs no module-level or system-level control functions, and that it performs only low-bandwidth unidirectional communication to the block modules, with no information needed from the block modules.

Next, consider the secondary-side QAB dc-link voltage regulators shown in FIG. 2. As illustrated, each a-, b-, and c-phase subcircuit within the $k^{th}$ module contains an identical proportional-integral (PI) compensator, Gdc, that generates the phase shifts $\phi_k:=[\phi_{a,k}, \phi_{b,k}, \phi_{c,k}]^T$ and ensures $[v^{dc}_{a,k}, v^{dc}_{b,k}, v^{dc}_{c,k}]^T \to nv^{pv}_k/3$. In other words, each QAB can be controlled to act as a fixed 1:n dc transformer (DCX) where the PV voltage is reflected to each secondary dc link. This strategy can is maximize active bridge converter efficiency by minimizing circulating currents and through the simultaneous use of zero-voltage switching.

Figure 3:
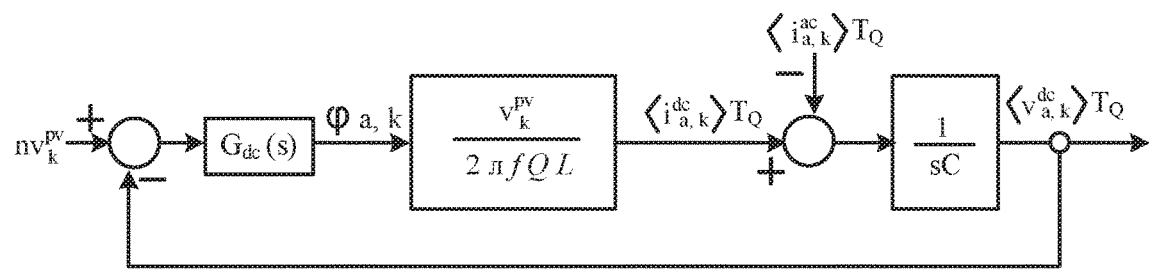
FIG. 3 shows a block diagram of example closed-loop dynamics of a subcircuit dc link within a block module.

The closed-loop dynamics for each dc link within the kth module can be represented using FIG. 3, and the loop-gain is:

$$l_k(s) = G_{dc}(s)\frac{v^{pv}_k}{2\pi f_Q L}\frac{1}{sC}. \quad (3)$$

For the sake of design, it can be assumed $v^{pv}_k$ is near its nominal maximum power point (MPP) voltage and use standard linear systems analysis to tune $G_{dc}(s)$. The bandwidth of the dc-link controller is designed to be sufficiently higher than twice the line frequency ($>>\omega/\pi$) so that the dc-link voltages are well regulated while each phase delivers single-phase ac power.

As a consequence of the dc-link control strategy, the PV input 201 and ac grid sides 210 are directly coupled, much like a single-stage three-phase inverter. Accordingly, PV MPPT is directly tied to the grid-side control strategy and the dc-links are controlled independently via the QAB phase shifts. To achieve autonomous power sharing among cascaded units, each set of ac phase terminals can be modulated to track the droop-controlled average value:

$$\langle v_k\rangle_{T_H}=v^d_k-R_d i, \quad (4)$$

where $T_H=f^1_H$ is the switching period for all H-bridges, the three-phase voltages are:

$$v_k^d := \begin{bmatrix} v_{a,k}^d \\ v_{b,k}^d \\ v_{c,k}^d \end{bmatrix} = V_k^d \begin{bmatrix} \cos(\theta_a) \\ \cos\left(\theta_a - \frac{2\pi}{3}\right) \\ \cos\left(\theta_a + \frac{2\pi}{3}\right) \end{bmatrix}, \quad (5)$$

and $\theta_a$ is a locally generated copy of the PLL angle within each block module. To ensure (4) is satisfied, the modulation signals for the kth set of H-bridges are given by:

$$m_k := \begin{bmatrix} m_{a,k} \\ m_{b,k} \\ m_{c,k} \end{bmatrix} = \mathrm{diag}^{-1}(v_k^{dc})(v_k^d - R_d i). \quad (6)$$

Figure 4:
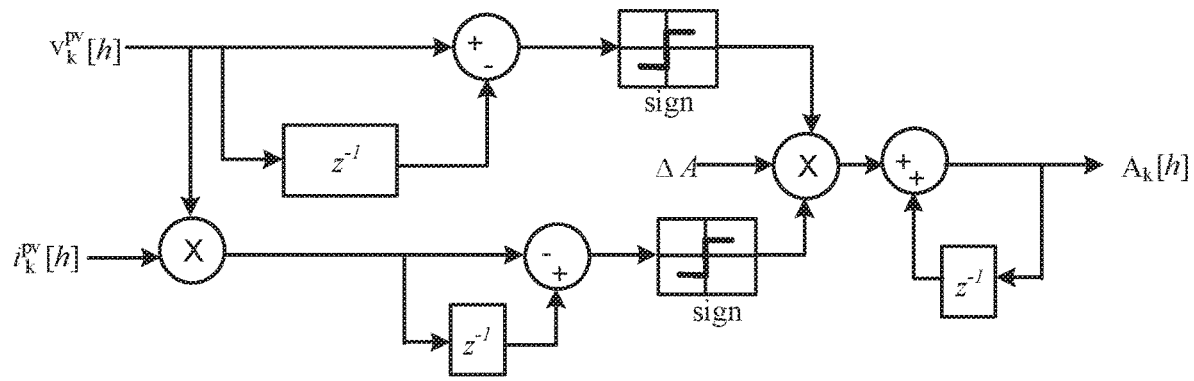
FIG. 4 shows a block diagram illustrating a perturb and observe maximum power point tracking (MPPT) algorithm.

The PV-side MPPT influences grid-side power delivery by modulating the droop voltage amplitude $V_k^d$. As shown in FIG. 2, the voltage amplitude is:

$$V_k^d = A_k n v_k^{pv} + \frac{V_g}{N}, \quad (7)$$

where $A_k$ is a voltage adjustment factor produced by the MPPT. Although a variety of MPPT algorithms are compatible with this setup, a simple perturb and observe method can be utilized that adjusts $A_k$ up/down with a fixed step size, $\Delta A$, and periodically at $T_{PO}$ as shown in FIG. 4.

Steady-State System Analysis

How the grid-side voltage and current waveforms depend on PV-side conditions can be analyzed. For example, the general case where PV string power is nonuniform among the N block modules can be considered first, and a special case where each PV string produces identical power can also be analyzed.

Figure 5:
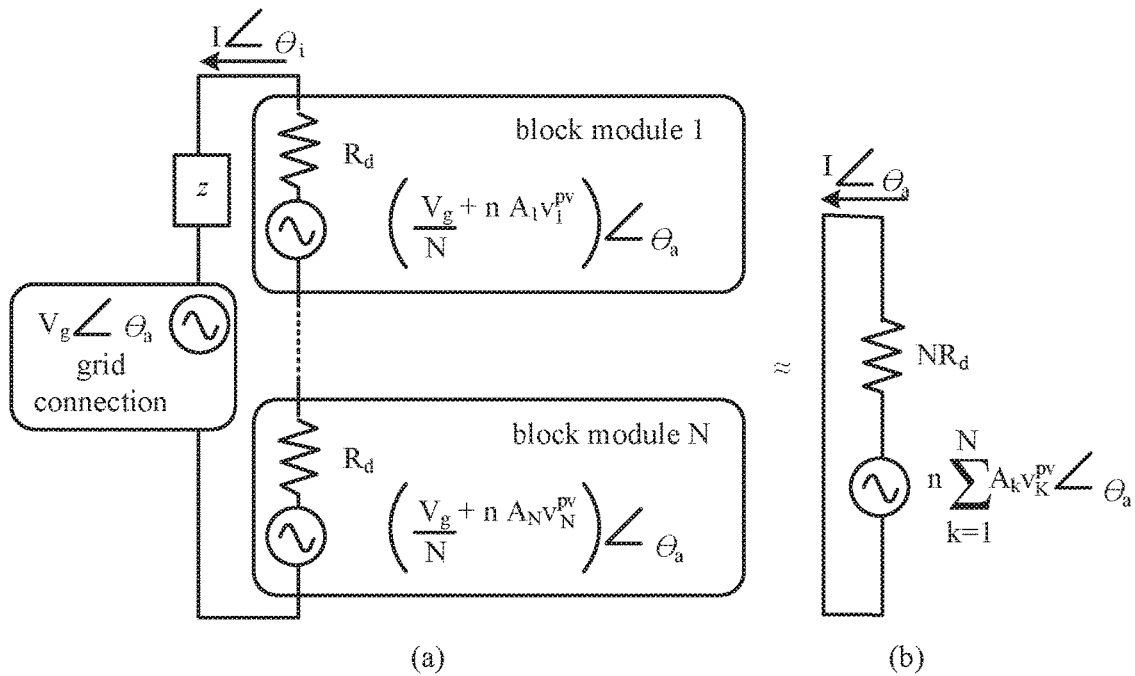
FIG. 5 shows a one-line phasor diagram with a multi-converter cascaded architecture and its steady-state ac waveforms resulting from the grid-side droop controls and a simplified representation.

The one-line phasor diagram labeled (a) in FIG. 5 shows the multi-converter cascaded architecture and its steady-state ac waveforms resulting from the grid-side droop controls. All phasor magnitudes in FIG. 5 correspond to peak values, and I denotes the ac peak current. Using (4), the amplitude of the kth H-bridge terminal voltage phasor is:

$$V_k = \sqrt{2 \langle |v_{a,k}^d - R_d i_a|^2 \rangle_{2\pi/\omega}}, \quad (8)$$

where the ac quantities on the right-hand side of (8) are assumed to be in sinusoidal steady state. Since the inverter filter, z, is designed to filter high-order harmonics, it can be assumed it has negligible impedance at the grid frequency. After neglecting z (for all analysis that follows) and summing voltages, a simplified representation labeled (b) as shown in FIG. 5 is obtained.

Nonuniform Power Delivery:

Kirchhoff's laws give the following general expressions for the stack current and grid power:

$$I = \frac{n}{NR_d} \sum_{k=1}^{N} A_k v_k^{pv}, \quad P = \frac{3nV_g}{2NR_d} \sum_{k=1}^{N} A_k v_k^{pv} \quad (9)$$

where P denotes the power absorbed by the grid. In (9), it is evident that the output current and grid power depends on the MPPT outputs, $A_1, \ldots, A_N$, as well as the QAB-turns ratio, PV voltages, and the number of modules.

From (9), the magnitude of the voltage across the $k^{th}$ H-bridge then follows as:

$$V_k = \frac{V_g}{N} + n A_k v_k^{pv}\left(1 - \frac{1}{N}\right) - \frac{n}{N} \sum_{j \neq k} A_j v_j^{pv}. \quad (10)$$

The efficiency of the $k^{th}$ converter as $\eta_k$ and the PV power is denoted as $P^{pv}_k := i^{pv}_k v^{pv}_k$. The conservation of energy then allows us to obtain the following expression, which illuminates the relationship between PV power production and grid-side voltage distribution across the stack:

$$\frac{P_j^{pv}}{\sum_{k=1}^{N} P_k^{pv}} = \frac{\eta_j V_j}{\sum_{k=1}^{N} \eta_k V_k} \quad (11)$$

Uniform Power Generation:

In the case where all dc-side PV strings produce identical power, the general expressions in simplify and yield insights into system behavior. These set of conditions should closely match those of well-designed large-scale PV plants (e.g., minimal partial shading or other mismatch factors) during nominal operation. If $A = A1, \ldots, AN$, $\eta = \eta 1, \ldots, \eta N$ and $v^{pv} = v^{pv}_1, \ldots, v^{pv}_N$, these relationships become:

$$I = \frac{nAv^{pv}}{R_d}, \quad P = \frac{3nV_g A v^{pv}}{2R_d}, \quad (12)$$

$$P_k^{pv} = \frac{P}{\eta N}, \quad V_k = \frac{V_g}{N}, \quad \forall\, k. \quad (13)$$

Here, (13) demonstrates that voltage and power sharing are natively obtained via the proposed droop control method.

System Validation

System operation, including operation of the dc-link controllers, string level MPP tracking, and ac-side power sharing without a central controller are verified by simulations reported in Achanta, Prasanta K., Johnson, Brian B., Seo, Gab-Su, Maksimovic, Dragan, A Multi-Level DC to Three-Phase AC Architecture for Photovoltaic Power Plants, IEEE Transactions on Energy Conversion, Vol. 34, No. 1, March 2019, pp. 181-190, in Section IV-A and experiments in Section IV-B, the entire document of which is incorporated by reference herein in its entirety as if fully set forth herein.

String PV-to-MVAC System Simulations

Figure 6:
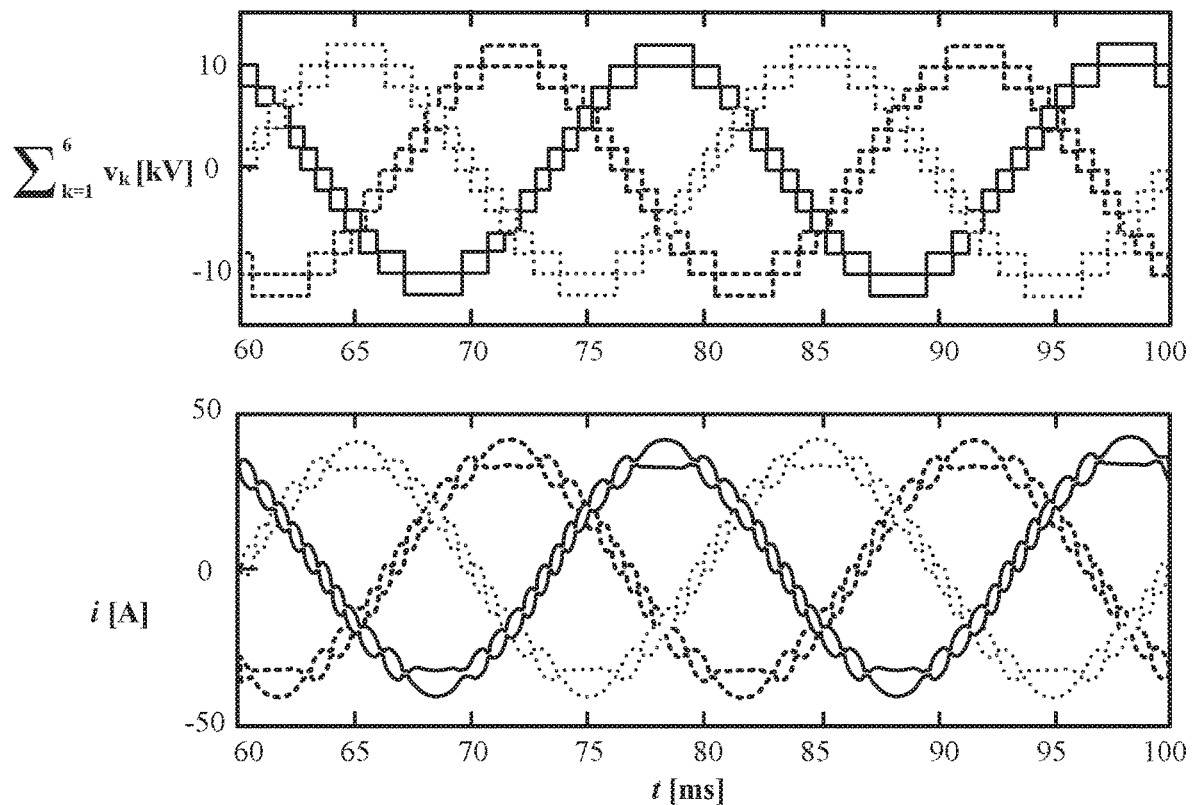
FIG. 6 shows graphs of three-phase steady-state voltage and current waveforms for an example system.

This section describes an example implementation for a representative 600 kW system connected to a 13.2 kV medium-voltage grid using N=6 block modules connected in series, as shown in FIG. 2. The system parameters are provided in Table I. Under nominal full-sun operating conditions, each PV string operates at MPP voltage of $v^{pv}_k = 1.05$ kV, and produces 100 kW. The block modules can be realized, for example, using 1.7 kV Silicon Carbide (SiC) switches for the primary side and 3.3 kV SiC devices for the secondary-side QAB switches. The inverter switches can be realized using insulated-gate bipolar transistors (IGBT) or SiC devices. FIG. 6 shows the steady-state ac-side waveforms for the case when all block modules operate under full-sun irradiation at identical MPP voltage and power. The output voltage of the multi-converter cascaded system has 2N+1=13 levels, demonstrating multi-level operation.

TABLE I
STRING PV TO MVAC SYSTEM PARAMETERS

| | | |
|---|---|---|
| N | No. of block modules | 6 |
| n | Transformer turns ratio | 2 |
| w | Grid frequency | $2\pi 50$ rad/s |
| $v^g$ | Grid voltage | $[7.62, 7.62, 7.62]^\tau$ kV$_{rms}$ |
| z | Grid side filter impedance | $[1 + j\, 0.314]$ Ω |
| $V_{mpp}$ | String MPP voltage | 1.05 kV |
| P | System power | 600 kW |
| $R_d$ | Virtual droop resistance | 48.5 Ω |
| ΔA | MPPT step size | 0.01 |

Figure 7:
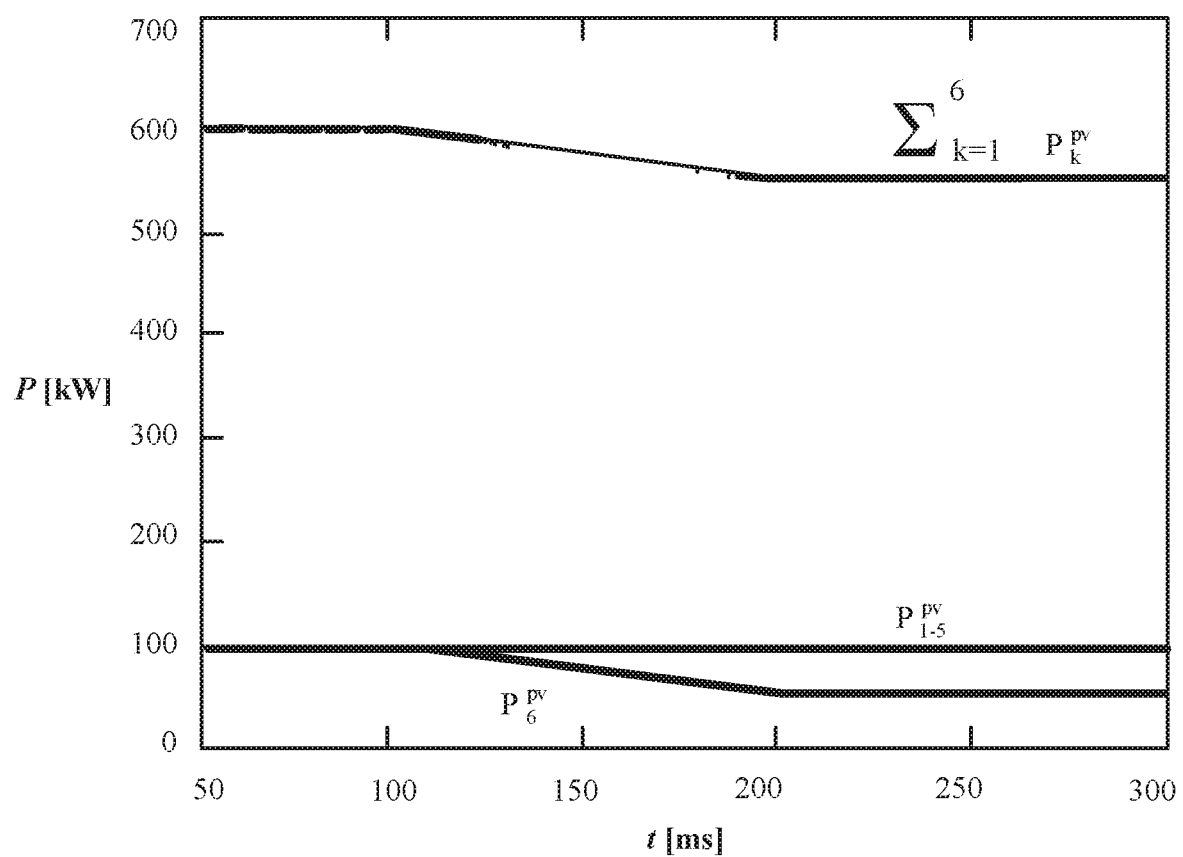
FIG. 7 is a graph showing an example system transitioning from uniform irradiation on photovoltaic strings to 50% shading on a photovoltaic string.
Figure 8:
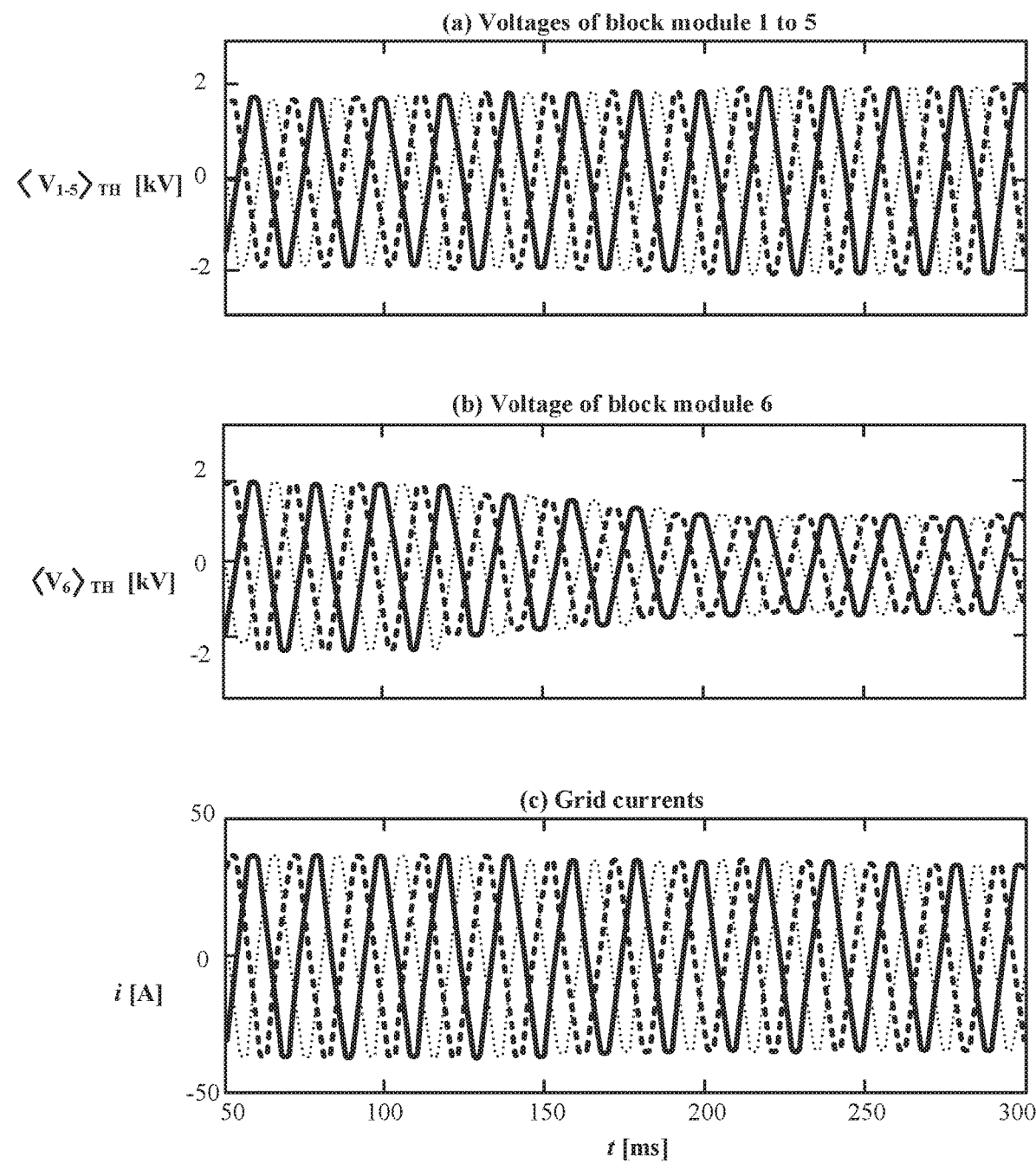
FIG. 8 shows graphs of waveforms showing autonomous and proportional power sharing operation among cascaded block modules when a system is transitioning from uniform irradiation on each photovoltaic string to 50% shading on a photovoltaic string.

To demonstrate the system's ability to operate with mismatched PV strings, FIG. 7 shows a case where initially all PV strings are operating at the same 100-kW level, followed by a 50% reduction in solar irradiation on the PV string connected to block #6. This corresponds to a 50-kW reduction in the power processed by block module #6. The remaining PV strings and block modules continue to operate at their nominal full-sun MPP. As shown in (11) and illustrated in FIG. 8, the ac-side voltages of block modules #1-#5 increase, whereas the output voltage of block module #6 is reduced, which demonstrates autonomous proportional power sharing among the block modules. The overall system power reduction is shown in the reduced grid currents in FIG. 8(c).

Figure 9:
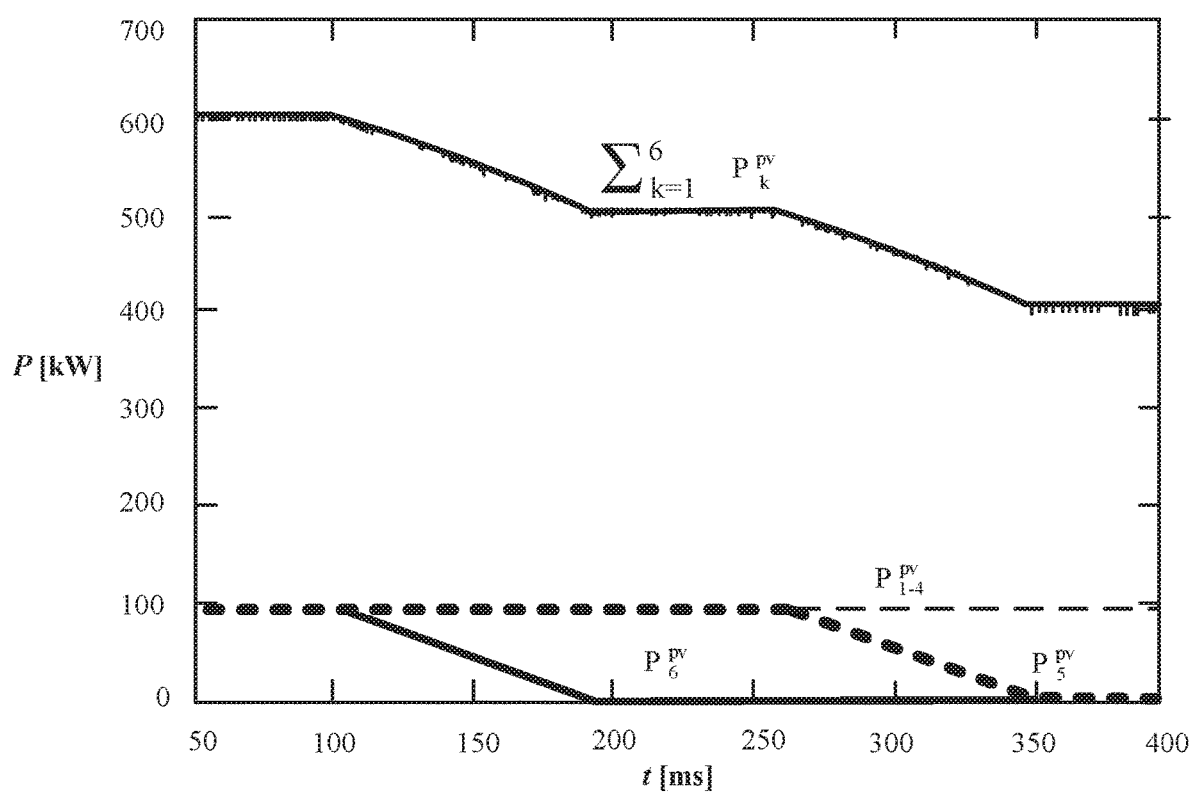
FIG. 9 is a graph showing a system transitioning from uniform irradiation across each photovoltaic string to zero irradiation on a plurality of photovoltaic strings.
Figure 10:
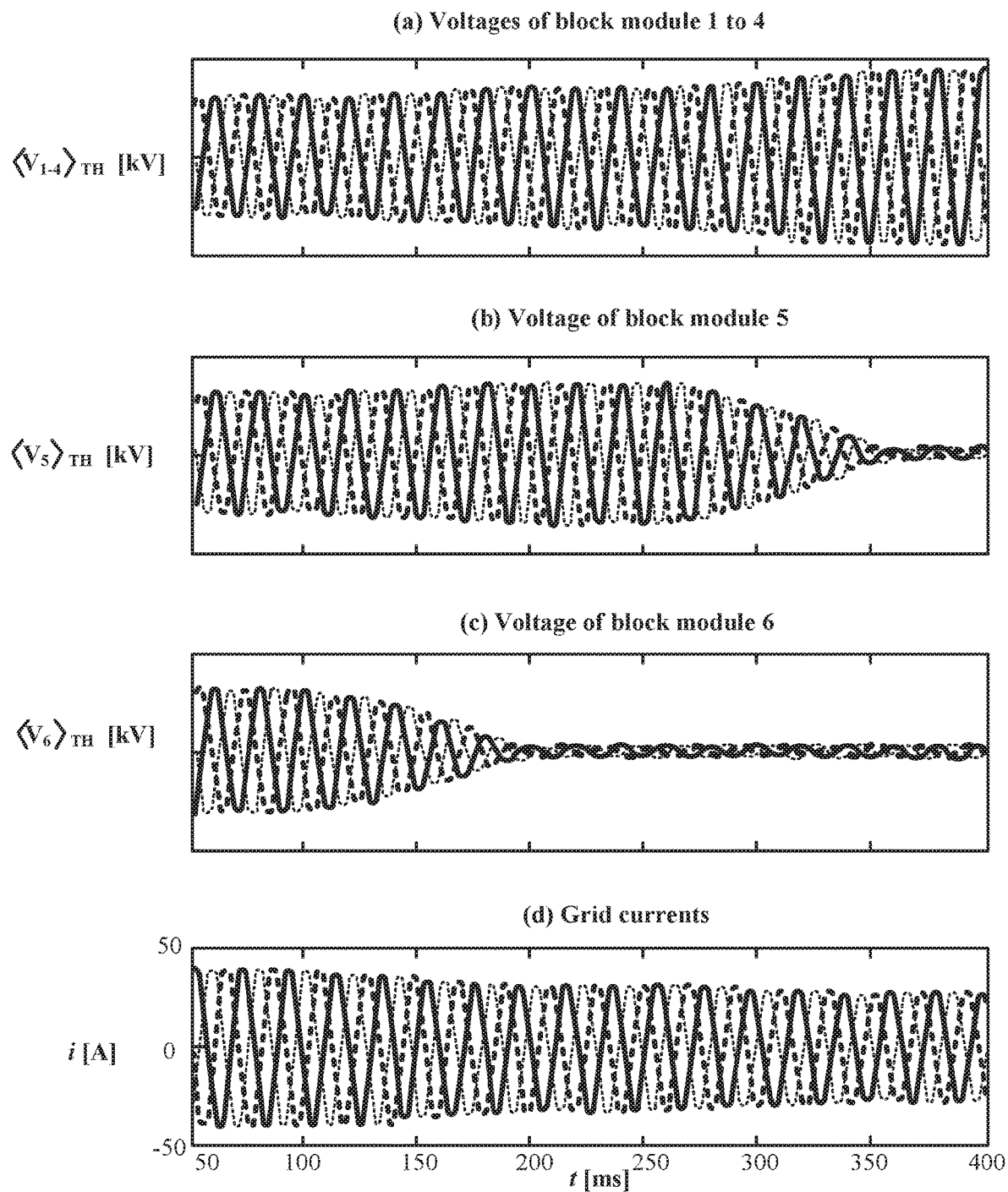
FIG. 10 shows graphs showing waveforms verifying autonomous and proportional power sharing operation among cascaded block modules when multiple photovoltaic strings produce zero power.

To further illustrate the ability of the system to perform under extreme mismatches, simulations are performed for the case where multiple PV strings generate zero power (see FIGS. 9-10). When two of six PV strings generate zero power, the voltages across those corresponding block modules are zero, and the remaining units share the grid voltage. The peak voltage across the other block modules in this extreme mismatch scenario is 2.7 kV and still within the 3.3 kV rating of the switching devices.

Figure 11:
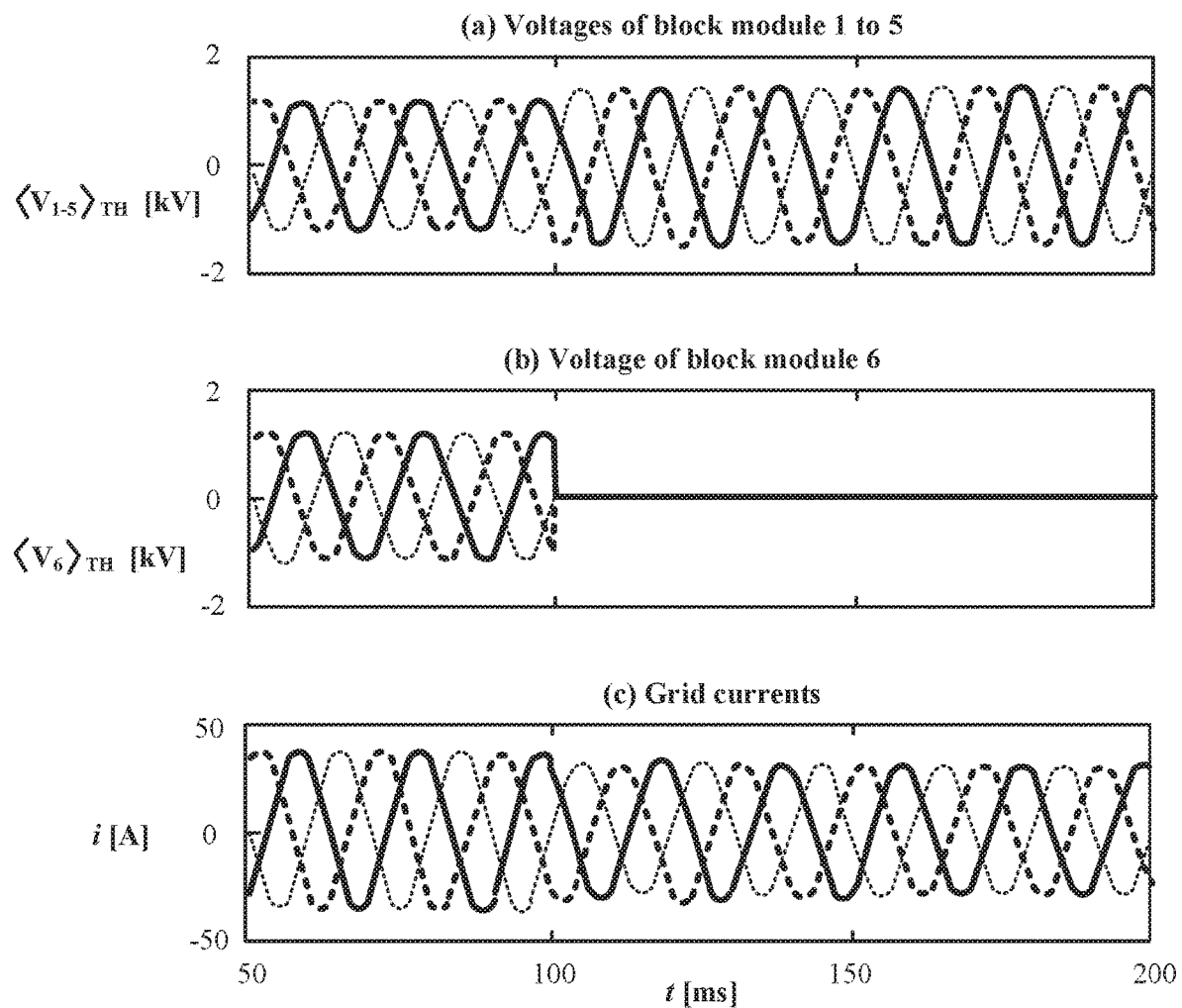
FIG. 11 shows graphs showing waveforms demonstrating an ability of a system to maintain operation even when one of a plurality of block modules is shorted out of the system.

In the case where a failure is detected within a block, that module can be shorted while still maintaining system operation. A scenario where block module #6 is bypassed is recreated in simulation, and the resulting waveforms are shown in FIG. 11.

Experimental Results

A scaled proof-of-concept prototype including three block modules has been constructed to verify system operation by experiments. The system parameters are summarized in Table II, and a single 250 W block module prototype is displayed in FIG. 12.

TABLE II
PARAMETERS OF THE EXPERIMENTAL PROTOTYPE

| | | |
|---|---|---|
| N | No. of block modules | 3 |
| $f_Q$ | QAB switching frequency | 100 kHz |
| $f_H$ | H-bridge switching frequency | 20 kHz |
| n | Transformer turns ratio | 1 |
| $C_{pv}$ | Input capacitance | 90 μF |
| C | Dc-link capacitance | 180 μF |
| L | Leakage inductance | 23 μH |
| $K_p$ | Proportional gain | $2.962 \times 10^{-1}$ rad/V |
| $K_i$ | Integral gain | $7.5 \times 10^{-3}$ rad/(V·s) |
| | MOSFETs | BSC046N10NS3 G |
| | Microcontroller | TMS320F28379D |
| | Experiments with PV module | |
| $V_{mpp}$ | PV module's MPP voltage | 36.8 V |
| z | load impedance | $[0.147\, j + (10\, \|\, -289\, j)]$ Ω |
| | Standalone cascaded experiments | |
| $v^{in}$ | Input voltage | 40 V |
| z | load impedance | $[0.147\, j + (50\, \|\, -289\, j)]$ Ω |
| | Grid-tied cascaded experiments | |
| w | Grid frequency | $2\pi 60$ rad/s |
| $v^{in}$ | Input voltage | 43 V |
| $v^g$ | Grid voltage | $[75, 75, 75]^\tau$ V$_{rms}$ |
| $R_d$ | Virtual droop resistance | 10 Ω |
| z | filter impedance | $[2 + 0.35\, j]$ Ω |

Using the prototype block modules, three sets of experimental results are provided to verify the key operational principles and feasibility. First, a single block module with PV at its input is presented to verify its fundamental functions, including dc-link regulation and MPPT operation. Next, experiments with N=3 cascaded block modules demonstrate the following: parallel-input series-three-phase-output operation, multi-level voltage synthesis, and grid-tied operation with a start-up sequence. The parameters for each setup are summarized in Table II.

Operation of Block Module with PV:

A single block module sourced by a PV module and connected to a balanced resistive load was considered. An objective is to demonstrate i) a well-defined start-up sequence, ii) dc-link voltage regulation and power balance without bulky decoupling capacitors, and iii) MPPT operation.

Figure 13:
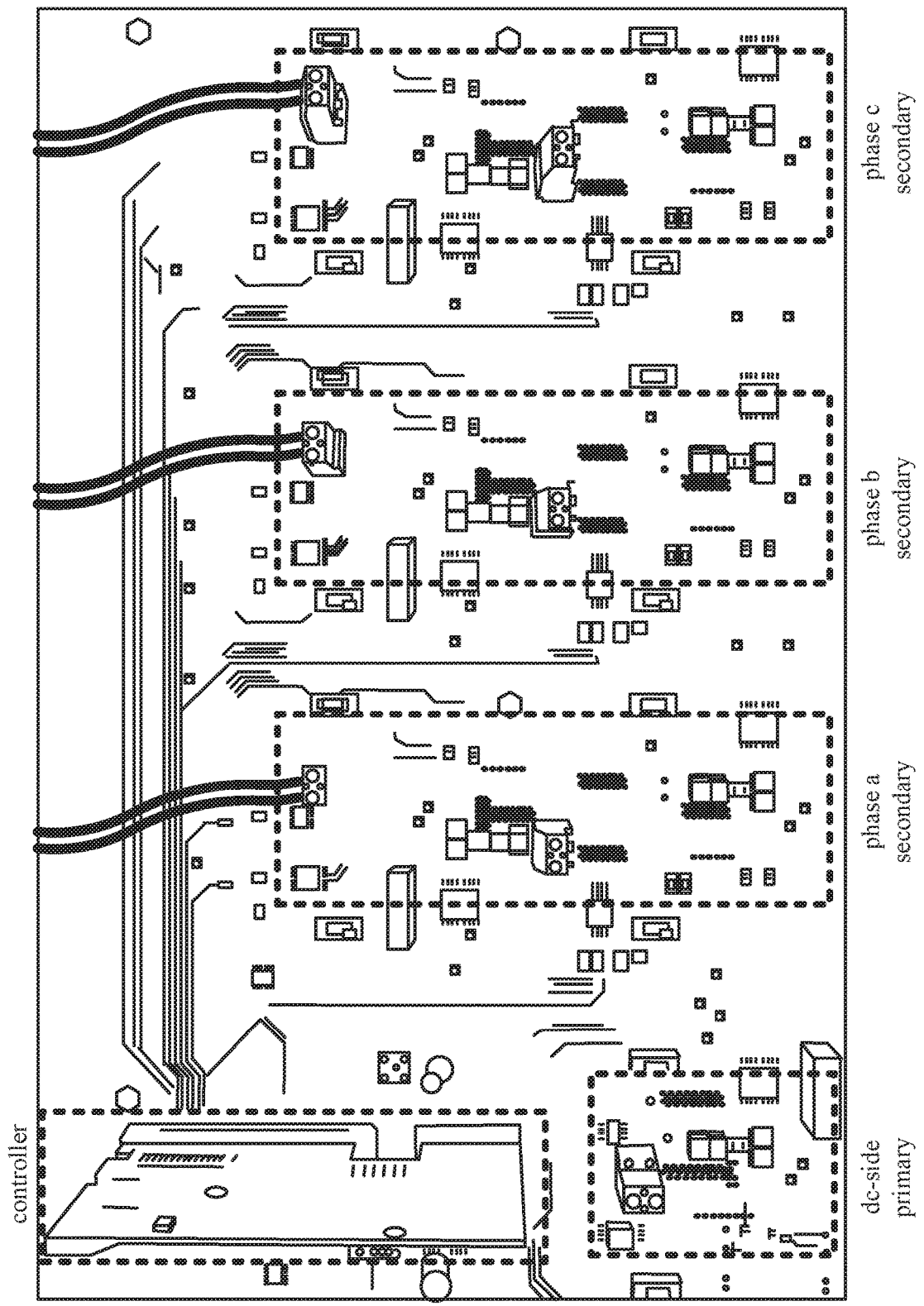
FIG. 13 is a schematic diagram of a prototype block module.
Figure 14:
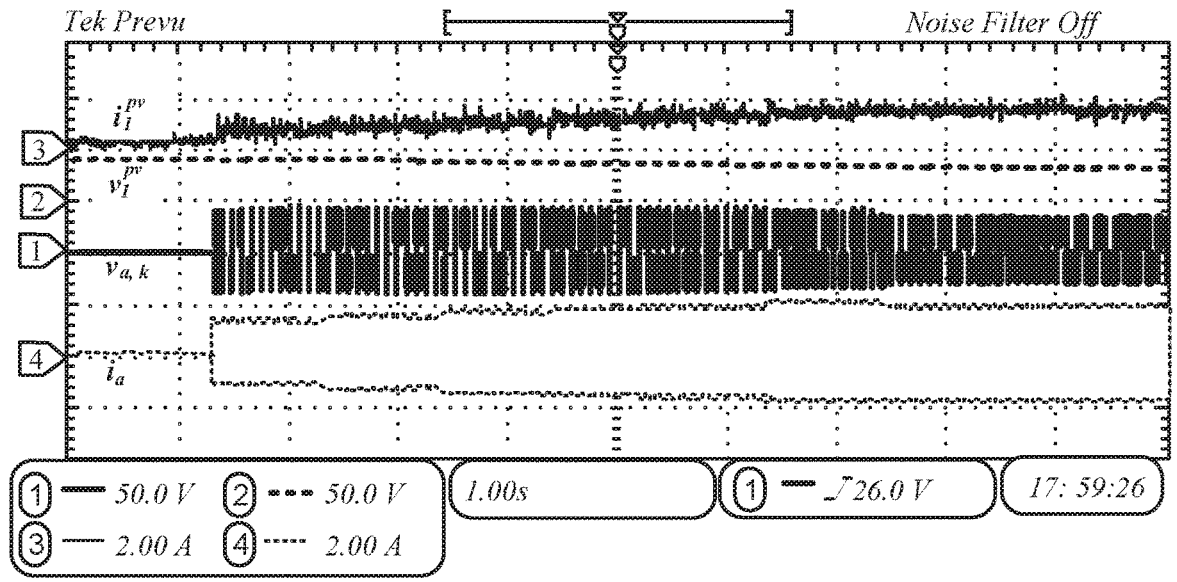
FIG. 14 is a graph showing an example system start-up operation in which a photovoltaic module gradually reaches a maximum power point (MPP) voltage of 36.8V from an open circuit voltage of 43 V.

In this setup, a block module is sourced by a 175 W PV module with nominal MPP voltage $v_{pv}$=36.8 V. FIG. 13 illustrates start-up operation of the system. Initially, the block module is off, which allows the PV module to reach its open-circuit voltage of 43 V. Once enabled, the QAB operates as a 1:1:1:1 converter, which charges the dc-link voltages to the PV module's open-circuit voltage. It is also noteworthy that the dc link voltages are regulated under zero power transfer. The three inverters then start switching and delivering power to the three-phase load. The modulation index of the inverters is adjusted by the MPPT controller such that the PV module voltage gradually approaches the MPP voltage, as shown in FIG. 13. As illustrated in FIG. 14, the MPP is reached, and peak power is delivered to the three-phase load. By comparing the smooth dc waveforms and balanced three-phase ac waveforms on the input and output sides of the converter, it is clear that power balance is maintained.

Figure 15:
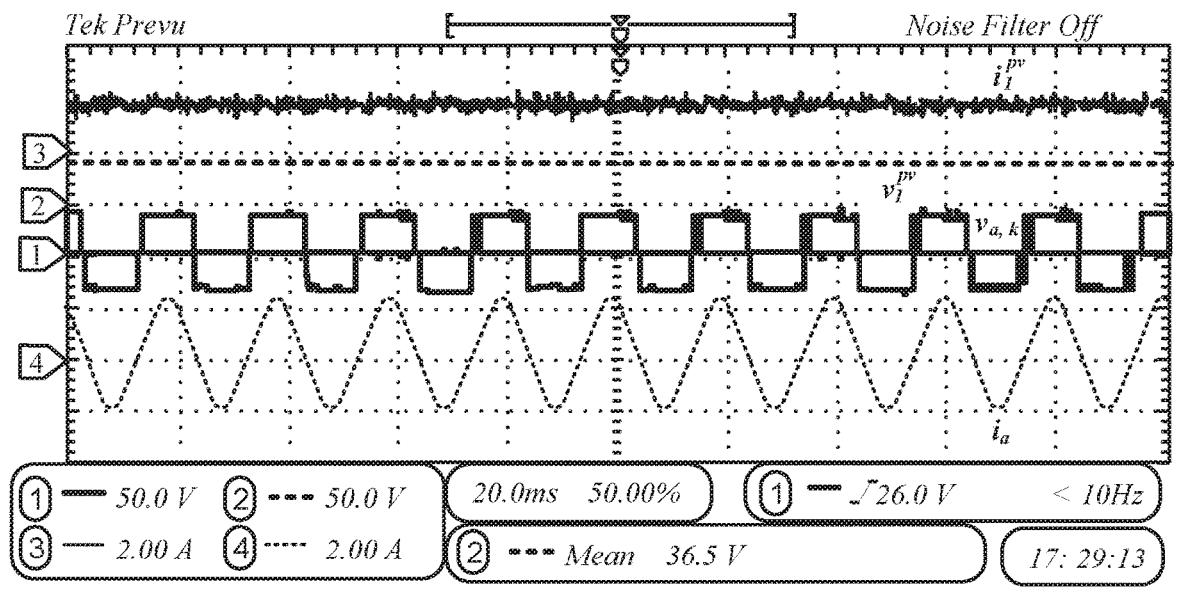
FIG. 15 is a graph showing steady-state operation of an example photovoltaic-powered block module delivering maximum power to a three-phased load in which phase a waveforms are shown for clarity.
Figure 16:
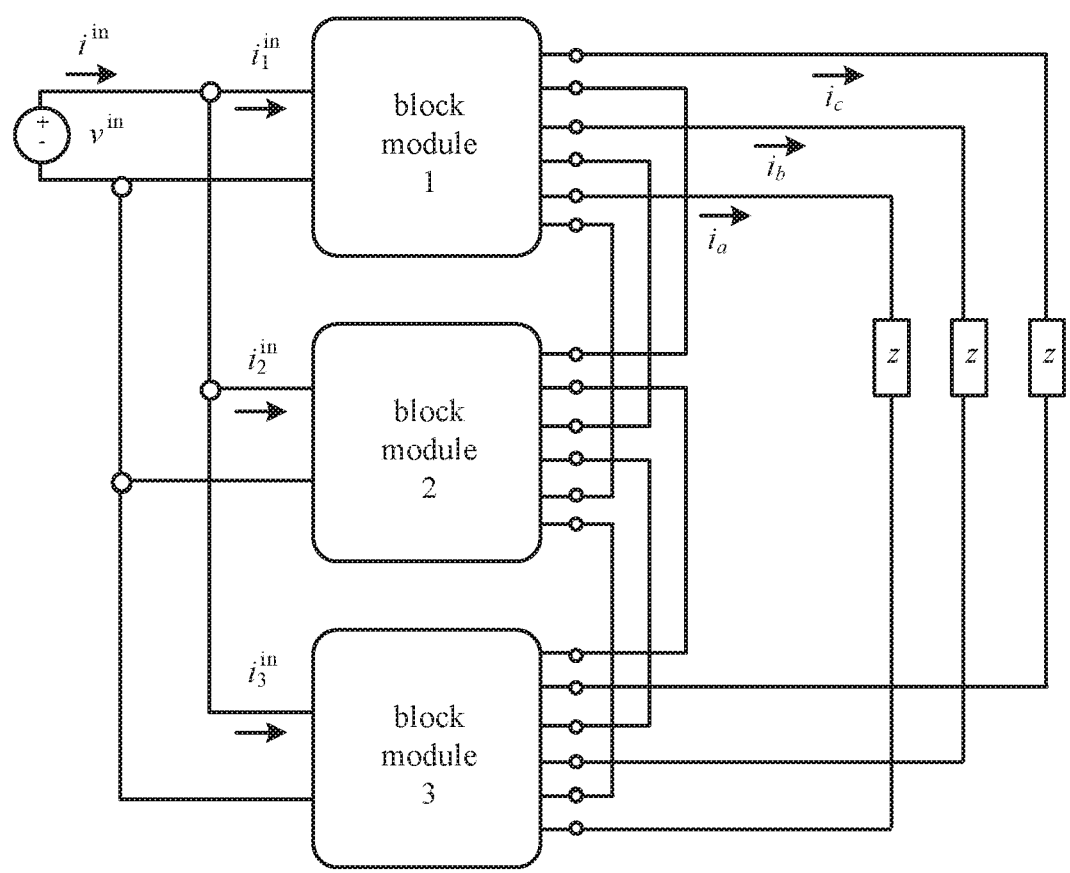
FIG. 16 is a block diagram of an experimental setup for stand-alone operation of three block modules connected in a parallel-input series-output configuration.
Figure 17:
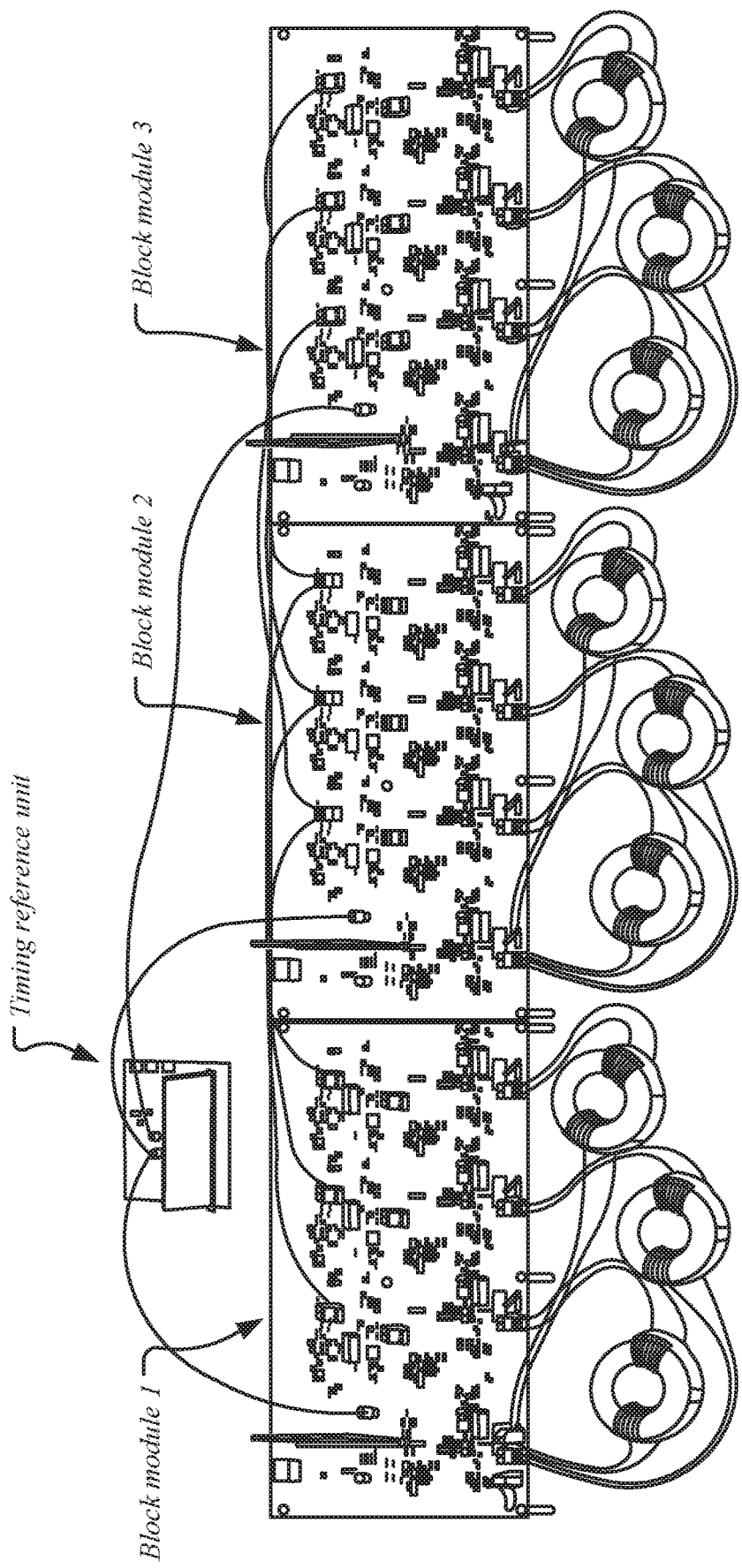
FIG. 17 is a schematic diagram showing an experimental setup comprising three block modules connected in series along with a timing reference unit.
Figure 18:
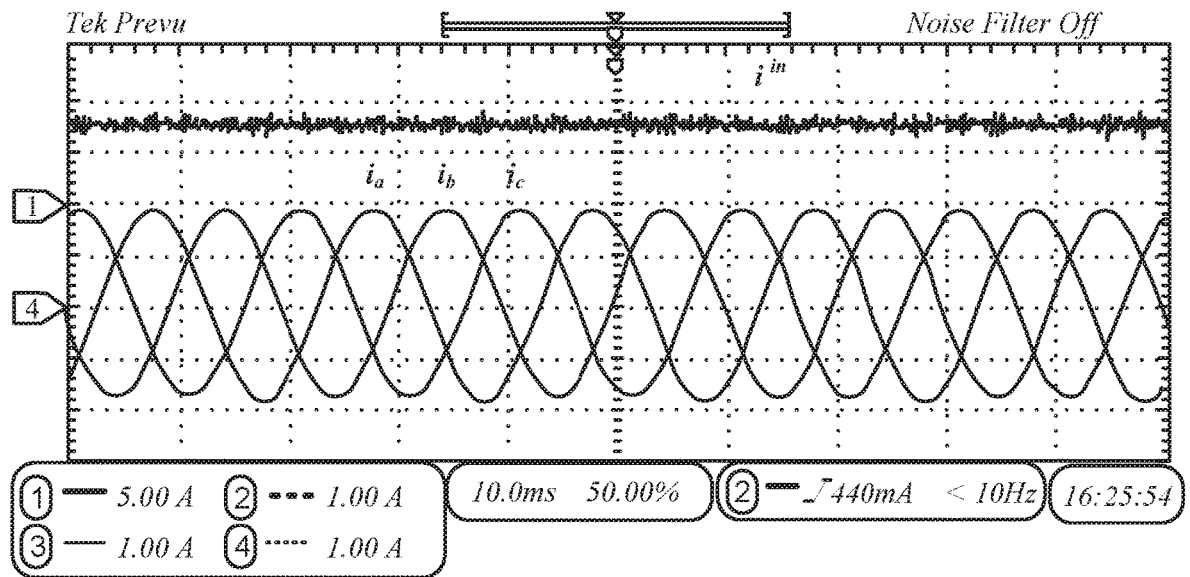
FIG. 18 is a graph showing DC input current and three-phase output currents of a series-stacked system with three block modules.

Stand-Alone Cascaded Operation of Three Block Modules:

Following the module-level MPPT demonstration, a multi-converter system with a voltage source across the inputs and a resistive ac-side load is considered. The three block modules are connected in series, as shown in FIG. 15, and the experimental setup is shown in FIG. 16. Dc to three-phase ac conversion and instantaneous input-output power balance is shown in FIG. 17. Three-phase multilevel waveforms of the series-connected system are shown in FIG. 18. Since the system can exploit the series-stacked structure at the ac side by interleaving the carriers of the inverters, seven voltage levels can be synthesized with three modules.

Figure 19:
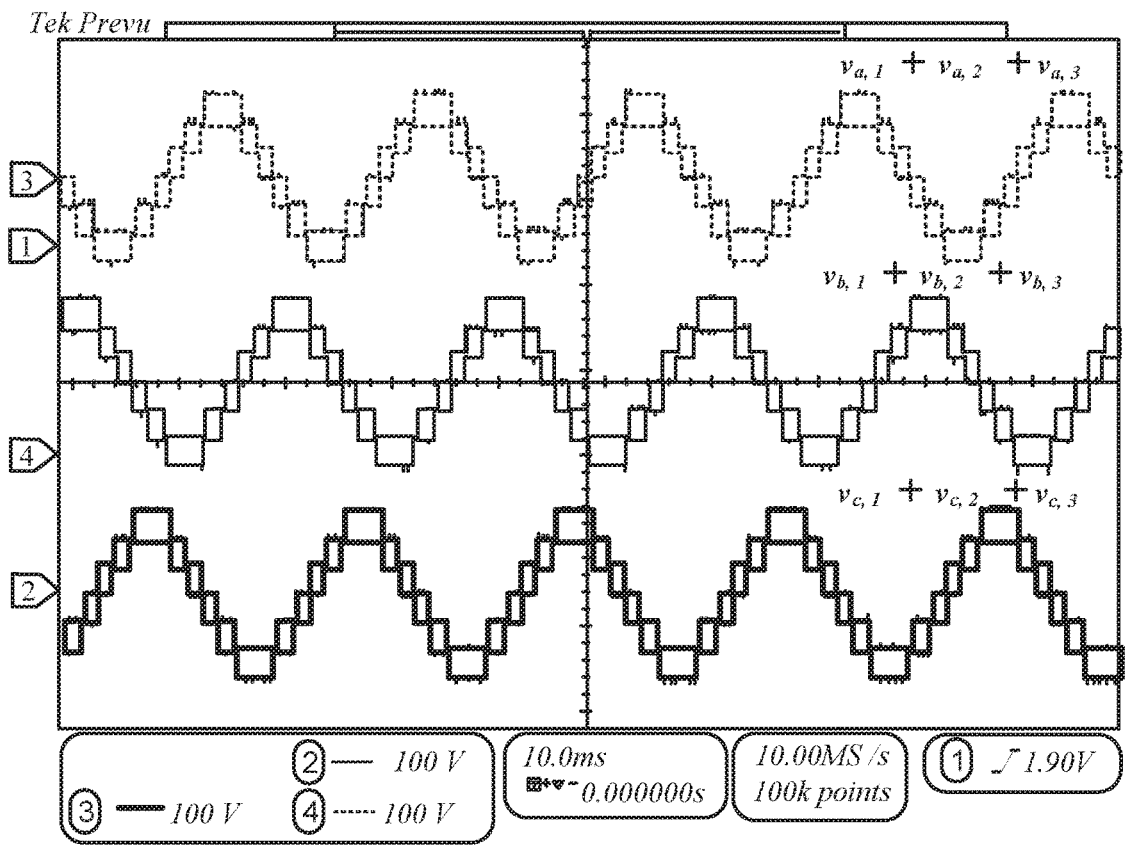
FIG. 19 is a graph showing three-phase ac-side voltages of a series-stacked system demonstrating multilevel operation of the system.
Figure 20:
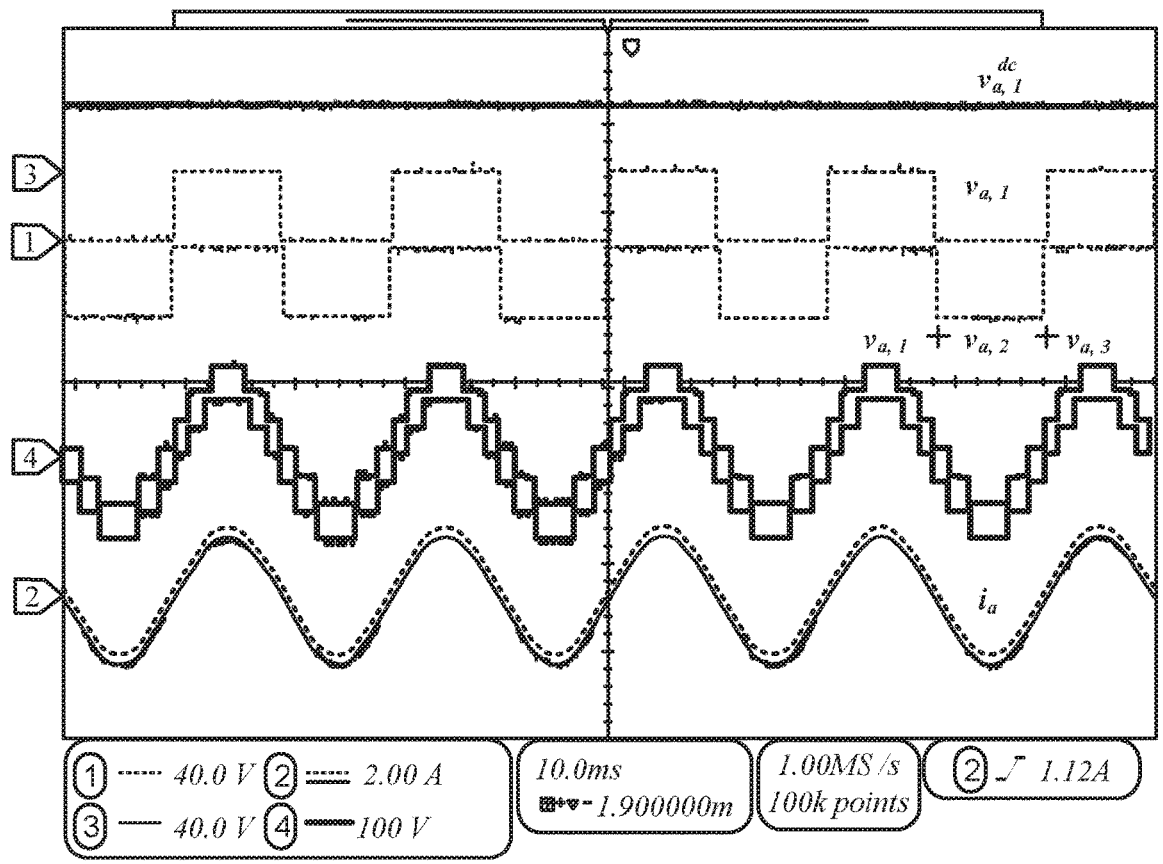
FIG. 20 is a graph of waveforms showing successful implementation of dc-link voltage regulation.

The bandwidth of each dc-link controller is 1.6 kHz, which is sufficiently high to ensure tightly regulated voltages during most transients. Each dc-link capacitor is minimally sized since it only needs to filter switching ripple. This is illustrated in FIG. 19, which shows how the dc-link voltage of phase-a of block module #1 remains regulated during several ac line cycles. Primary and secondary QAB transformer currents at the switching timescale are shown in FIG. 20. Note how the individual secondary-side currents have different amplitudes and phase shifts, demonstrating the ability of the QAB to independently control the three dc-link voltages by phase shift modulation of the secondary bridges.

Figure 21:
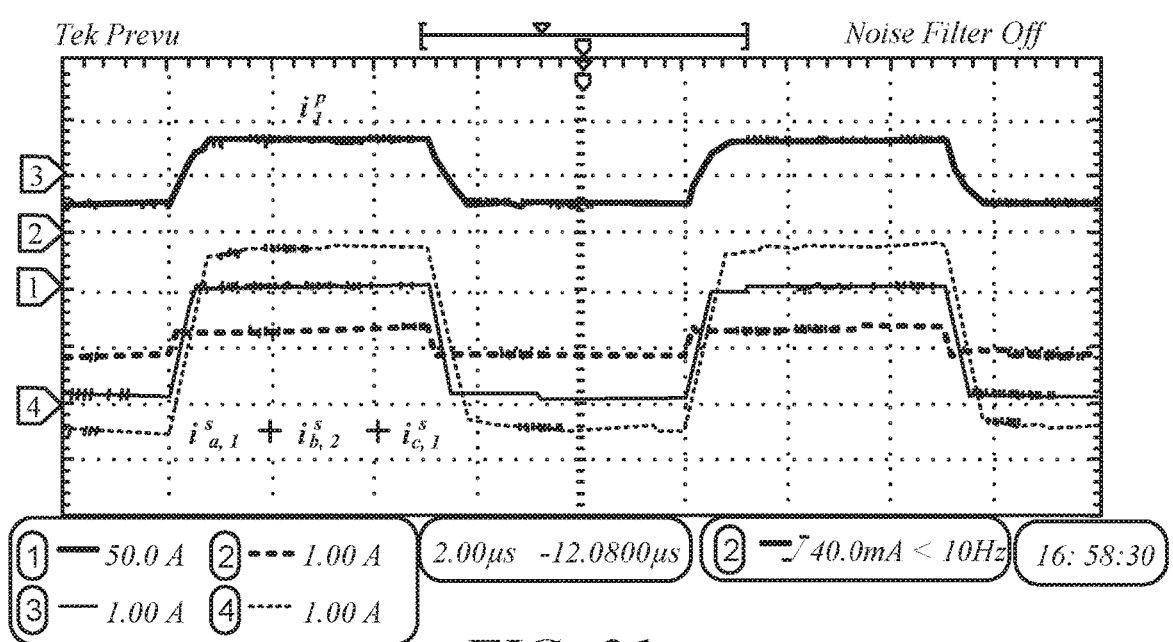
FIG. 21 is a graph showing primary and secondary transformer currents of a quadruple active bridge in which secondary currents have different phase shifts with respect to a primary current.
Figure 22:
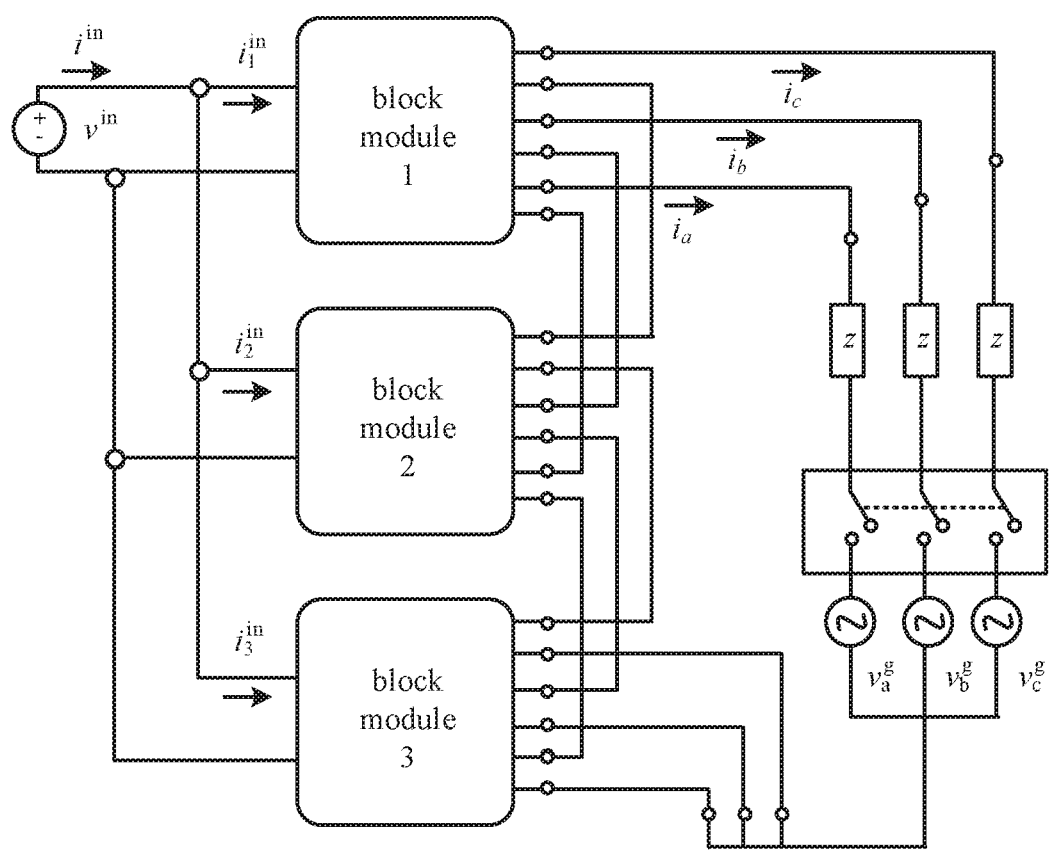
FIG. 22 is a block diagram of an experimental system diagram for a grid-tied cascaded operation of three prototype block modules connected in parallel-input series-output configuration.
Figure 23:
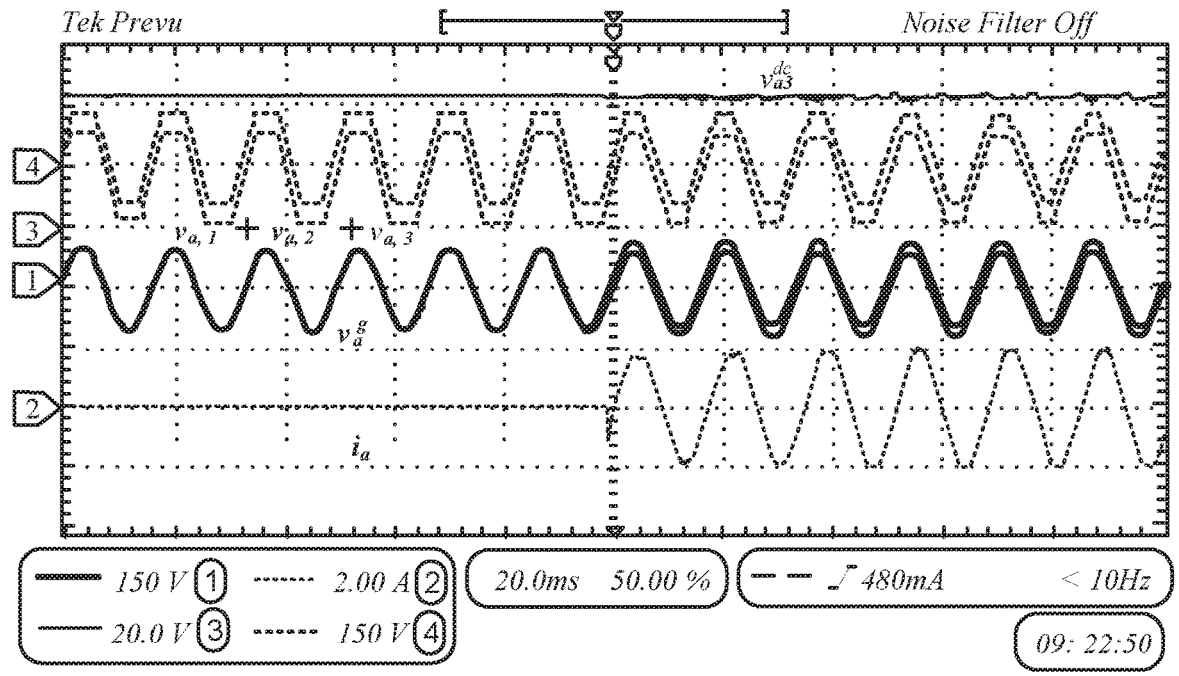
FIG. 23 is a graph of waveforms showing a regulated dc-link voltage during a system power ON transition.
Figure 24:
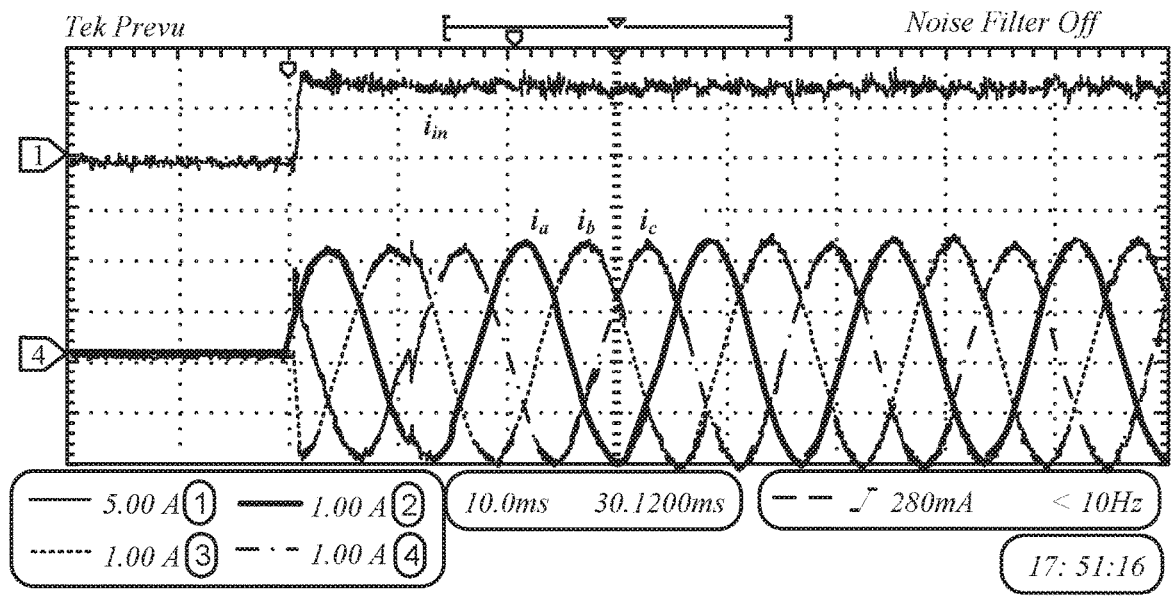
FIG. 24 is a graph of system input and output currents during a turn on transient.

Grid-Tied Cascaded Operation:

To verify grid-tied operation such as start-up, the system of three block modules is connected to a three-phase grid, as shown in FIG. 21. Since other functionalities were verified by the previous experiments, system operation under a start-up transient and when the grid interconnect switch is closed can be considered. FIG. 22 captures the dc-link voltage of block module 3, the multilevel waveforms along with the grid voltage and grid current of phase-a under the turn on transient. As demonstrated, the multi-converter system synthesizes multi-level voltages without high bandwidth communication (only zero-crossing information from the timing reference board is needed). Multilevel operation is another key benefit since it allows us to relax ac-side filtering requirements and obtain enhanced power density. FIG. 23 shows the system input and output currents. Note that the dc-link voltage is maintained during the abrupt transition from zero ac-side power transfer in the grid-disconnected state to 300 Wac power in the grid-connected state.

A PV inverter architecture comprising a plurality of stackable dc to three-phase ac converter block modules is provided in various example implementations. In one implementation, for example, several such blocks, each containing autonomous controls and a converter, are connected in series on their ac sides to obtain MVAC interfaces for PV power plants without the need for bulky line-frequency transformers. Each block module comprises a quadruple active bridge (QAB) dc-dc converter and three single-phase inverters. The QAB provides isolation between the PV input and each of the three ac-side phases within each block module. Since incoming PV power is transferred as constant balanced three-phase ac power, instantaneous input-output power balance is maintained, and bulk energy storage is unnecessary. A suite of controllers is provided to ensure MPPT, dc-link voltage regulation, and/or ac-side voltage sharing across the stack. Taken together, the converter structure and distributed controls enable a modular and scalable system architecture. The proposed architecture is validated in a simulation of a medium-voltage 13.2 kV system and in a scaled proof-of-concept experimental prototype comprised of three 250 W block module.

Although implementations have been described above with a certain degree of particularity, those skilled in the art could make numerous alterations to the disclosed embodiments without departing from the spirit or scope of this invention. For example, although many implementations described herein are described with reference to photovoltaic (PV) applications, PV applications are only one possible application for the converter modules and system architectures described herein. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A modular dc-ac converter module comprising:
at least one dc port fed by a dc source;
three ac inverters, wherein each ac inverter of the three ac inverters receives a dc input from the at least one dc port and generates three single-phase ac outputs at different phases with respect to each other;
at least three ac ports, wherein each ac port of the at least three ac ports is coupled to a different corresponding one of the three ac inverters, respectively;
a converter, wherein the converter isolates the at least one dc port from the at least three ac ports;
a timing reference unit, wherein the timing reference unit communicates a timing signal, responsive to one of the three single-phase ac outputs, to each of the three inverters; and
a local controller coupled with at least the timing reference unit, the dc port, and the three ac inverters and configured to provide output control.

2. The modular dc-ac converter of claim 1 wherein the dc port is coupled to a full bridge power converter.

3. The modular dc-ac converter of claim 2 wherein the full bridge power converter comprises a quadruple active bridge (QAB).

4. The modular dc-ac converter of claim 1 wherein each ac port of the at least three ac ports is each coupled to a full bridge converter.

5. The modular dc-ac converter of claim 3 wherein the QAB the dc port and THE three ac ports from each other.

6. The modular dc-ac converter of claim 1 wherein the local controller is adapted to perform at least one of dc-link voltage regulation, maximum power point tracking and droop control to provide ac-side voltage and power balancing.

7. The modular dc-ac converter of claim 1 wherein the dc port is coupled to a half bridge power converter.

8. The modular dc-ac converter of claim 1 wherein each ac port of the at least three ac ports are each coupled to a half bridge converter.

9. The modular dc-ac converter of claim 1 wherein the at least one dc port is coupled in series with at least a second dc port of a second modular dc-ac converter.

10. The modular dc-ac converter of claim 1 wherein the three single-phase ac outputs are coupled in series with an ac output node of a second modular dc-ac converter.

11. The modular dc-ac converter of claim 1 wherein the at least one dc port is coupled in parallel with a second dc port of a second modular dc-ac converter.

12. The modular dc-ac converter of claim 9 wherein the three single-phase ac outputs are coupled in series with an ac output node of the second modular dc-ac converter.

13. The modular dc-ac converter of claim 9 wherein three single-phase ac outputs of the second modular dc-ac converter are coupled to a second ac load.

14. The modular dc-ac converter of claim 11 wherein the three single-phase ac outputs of the second modular dc-ac converter are coupled in series with an ac output node of the second modular dc-ac converter.

15. The modular dc-ac converter of claim 1 wherein the dc port is coupled to at least a photovoltaic source.

16. The modular dc-ac converter of claim 1 wherein the ac port is coupled to at least an ac grid.

17. A system comprising a plurality of modular dc-ac converters wherein each of the plurality of modular dc-ac converters comprises:

at least one dc port fed by a dc source;

three ac inverters, wherein each ac inverter of the three ac inverters receives a dc input from the at least one dc port and generates three single-phase ac outputs at different phases with respect to each other;

at least three ac ports, wherein each ac port of the at least three ac ports is coupled to a different corresponding one of the three ac inverters, respectively;

a converter, wherein the converter isolates the at least one dc port from the at least three ac ports;

a timing reference unit, wherein the timing reference unit communicates a timing signal, responsive to one of the three single-phase ac outputs, to each of the three inverters; and a local controller coupled with at least the timing reference unit, the dc port, and the three ac inverters and configured to provide output control.

18. The system of claim 17 wherein the at least one dc port of a first modular dc-ac converter of the plurality of modular dc-ac converters is coupled in series with at least one dc port of at least a second modular dc-ac converter.

19. The system of claim 17 wherein the at least one dc port of the first modular dc-ac converter of the plurality of modular dc-ac converters is coupled in parallel with at least one dc port of at least the second modular dc-ac converter.

20. The system of claim 17 wherein the three single-phase ac outputs of the first modular dc-ac converter of the plurality of modular dc-ac converters is coupled in series with an ac output node of at least the second modular dc-ac converter.

* * * * *